US011882326B2

(12) United States Patent
Ward et al.

(10) Patent No.: US 11,882,326 B2
(45) Date of Patent: Jan. 23, 2024

(54) COMPUTER SYSTEM AND METHOD FOR BROADCASTING AUDIOVISUAL COMPOSITIONS VIA A VIDEO PLATFORM

(71) Applicant: Mux, Inc., San Francisco, CA (US)

(72) Inventors: Matt Ward, San Francisco, CA (US); Phil Cluff, San Francisco, CA (US); Walker Griggs, San Francisco, CA (US); Garrett Graves, San Francisco, CA (US)

(73) Assignee: Mux, Inc., San Francisco, CA (US)

( * ) Notice: Subject to any disclaimer, the term of this patent is extended or adjusted under 35 U.S.C. 154(b) by 0 days.

(21) Appl. No.: 18/083,208

(22) Filed: Dec. 16, 2022

(65) Prior Publication Data

US 2023/0209110 A1    Jun. 29, 2023

Related U.S. Application Data

(60) Provisional application No. 63/290,571, filed on Dec. 16, 2021.

(51) Int. Cl.
*H04N 21/2365* (2011.01)
*H04N 21/2187* (2011.01)
*H04N 21/234* (2011.01)

(52) U.S. Cl.
CPC ..... *H04N 21/2365* (2013.01); *H04N 21/2187* (2013.01); *H04N 21/23418* (2013.01)

(58) Field of Classification Search
CPC ........... H04N 21/2365; H04N 21/2187; H04N 21/23418
USPC .......................................................... 725/32
See application file for complete search history.

(56) References Cited

U.S. PATENT DOCUMENTS 10,419,826 B2 *  9/2019  Geduldig ........... H04N 21/4316
2022/0004254 A1 * 1/2022  Roberts .......... H04N 21/234363

* cited by examiner

*Primary Examiner* — Nnenna N Ekpo
(74) *Attorney, Agent, or Firm* — Run8 Patent Group, LLC; Peter Miller

(57) ABSTRACT

A method including: accessing a first configuration; accessing a primary video stream comprising a first set of video content, from a first online video platform; accessing a secondary video stream comprising a second set of video content; and at an initial time, combining the primary video stream and the secondary video stream according to the default viewing arrangement; at a first time, detecting the first trigger event in the primary video stream; in response to detecting the first trigger event, combining the primary video stream and the secondary video stream according to the first target viewing arrangement, and publishing the first composite video to a second video platform; and at a second time, detecting the second trigger event in the secondary video stream; in response to detecting the second trigger event, combining the primary video stream and the secondary video stream according to the second target viewing arrangement.

20 Claims, 9 Drawing Sheets

COMPUTER SYSTEM AND METHOD FOR BROADCASTING AUDIOVISUAL COMPOSITIONS VIA A VIDEO PLATFORM

CROSS-REFERENCE TO RELATED APPLICATIONS

This application claims the benefit of U.S. Provisional Application No. 63/290,571, filed on 16 Dec. 2021, which is incorporated in its entirety by this reference.

TECHNICAL FIELD

This invention relates generally to the field of digital content distribution and more specifically to a new and useful computer system and method for broadcasting audiovisual compositions via a video platform in the field of digital content distribution.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
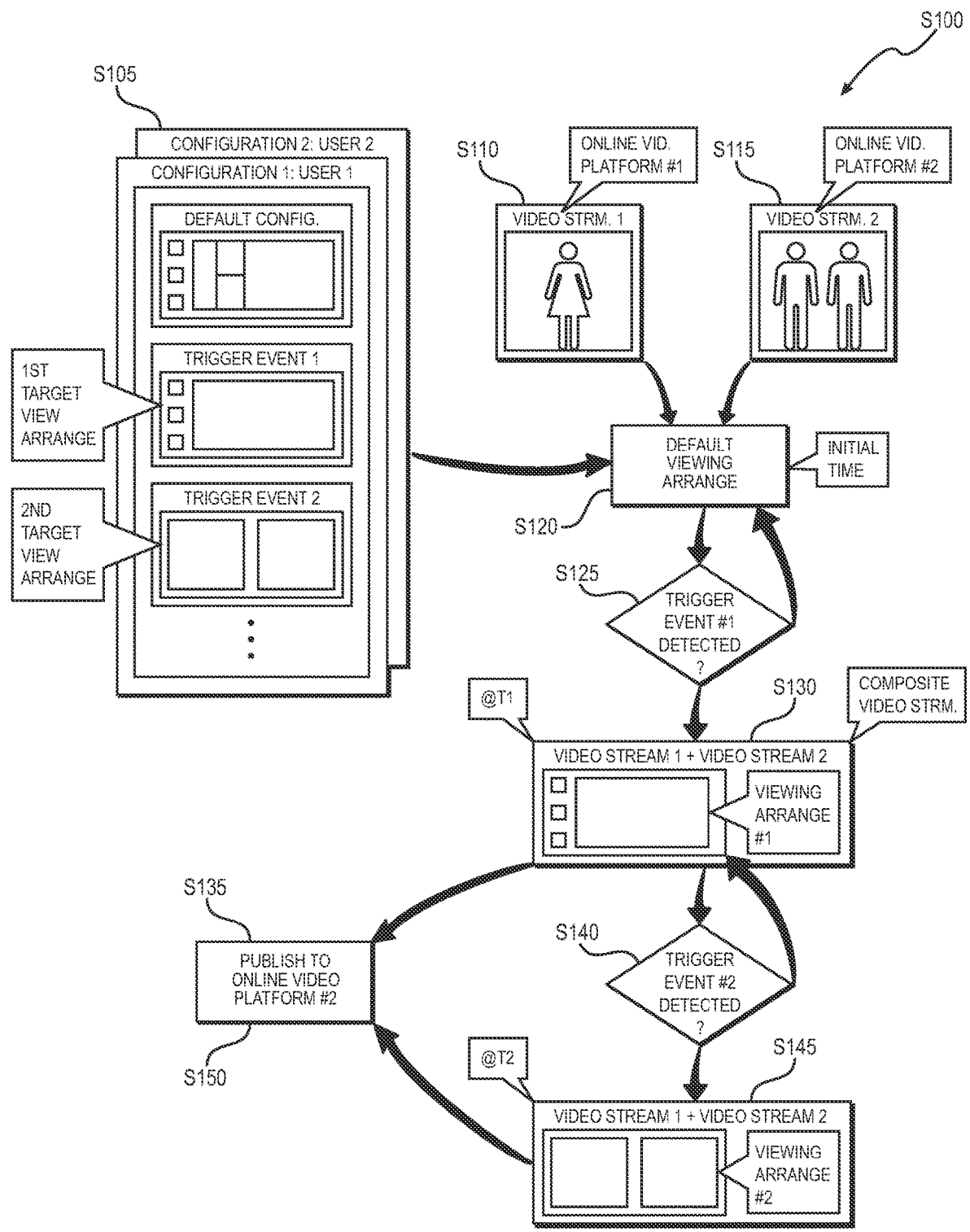
FIG. 1 is a schematic representation of a first method.

As shown in FIG. 1, for a first streaming event associated with a first user, a first method S100 includes: accessing a first configuration defining, a default viewing arrangement defining a default set of viewing characteristics, a first trigger event linked to a first target viewing arrangement defining a first set of viewing characteristics different from the default set of viewing characteristics; and a second trigger event linked to a second target viewing arrangement defining a second set of viewing characteristics different from the first set of viewing characteristics in Block S105; accessing a primary video stream comprising a first set of video content, from a first online video platform in Block S110; accessing a secondary video stream comprising a second set of video content in Block S115; and, at an initial time, combining the primary video stream and the secondary video stream according to the default viewing arrangement in Block S120.

The first method S100 further includes: at a first time, detecting the first trigger event in the primary video stream in Block S125; in response to detecting the first trigger event, combining the primary video stream and the secondary video stream into a first composite video according to the first target viewing arrangement in Block S130; and publishing the first composite video to a second video platform, different from the first video platform, approximately concurrently with the primary video stream in Block S135. The first method S100 further includes: at a second time, detecting the second trigger event in the secondary video stream in Block S140; in response to detecting the second trigger event, combining the primary video stream and the secondary video stream into a second composite video according to the second target viewing arrangement in Block S145; and updating the first composite video with the second composite video published to the second video platform in Block S150.

1.1.1 First Variation

Figure 3:
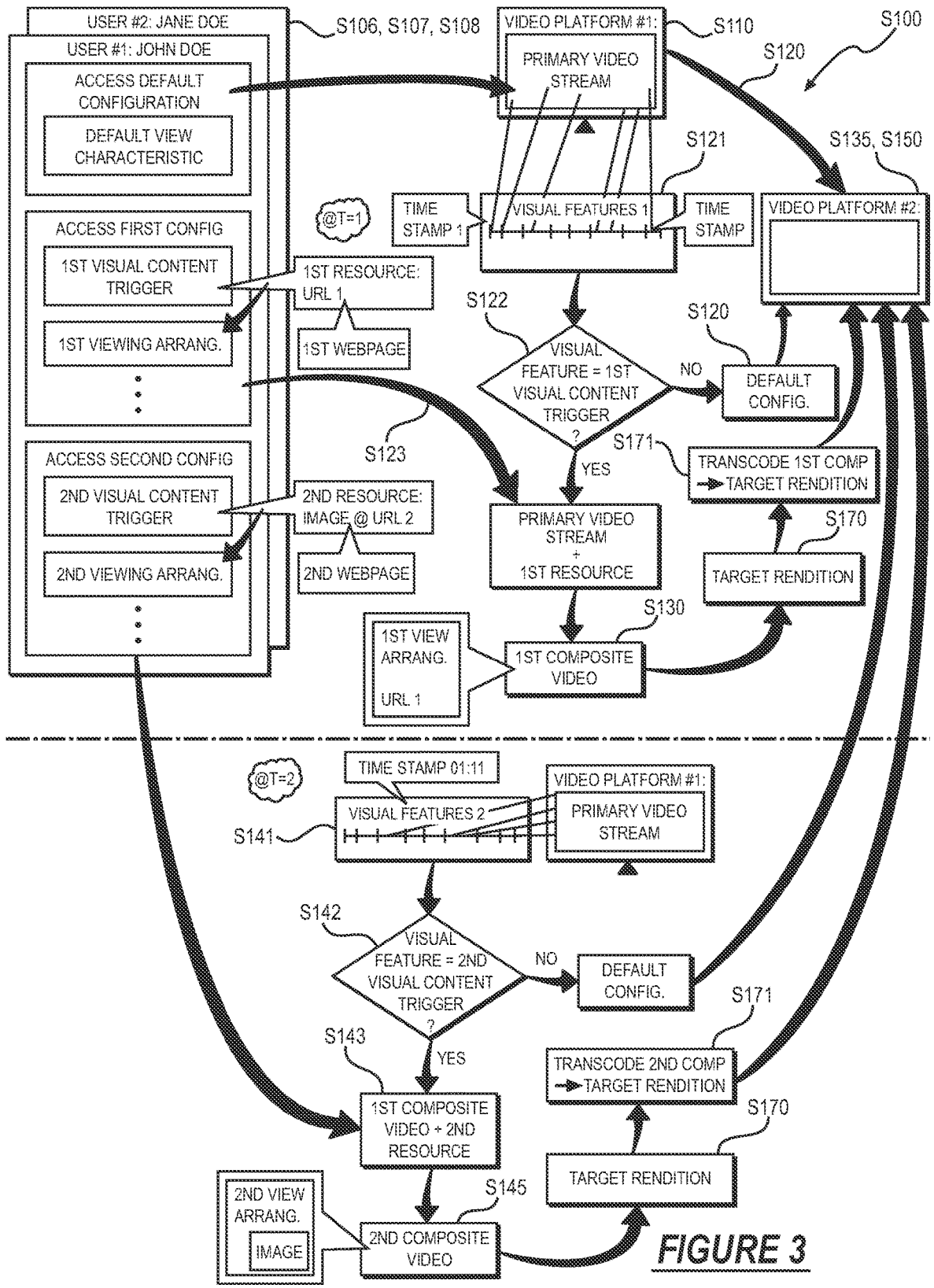
FIG. 3 is a schematic representation of one variation of the first method.

As shown in FIG. 3, one variation of the method S100 includes: for a first streaming event associated with a first user, accessing a default configuration defining a default set of viewing characteristics in Block S106; accessing a first configuration defining a first visual content trigger linked to a first resource, and a first viewing arrangement of visual content of a primary video stream and the first resource in Block S107; and accessing a second configuration defining a second visual content trigger linked to a second resource, and a second viewing arrangement of visual content of the primary video stream and the second resource in Block S108. The variation of method S100 further includes: accessing a primary video stream recorded by a remote computing device associated with the first user, from a first video platform in Block S110; and at an initial time, streaming the primary video stream to a second video platform according to the default configuration in Block S120.

This variation of the method S100 further includes: at a first time, detecting a first set of visual features in the primary video stream in Block S121; correlating a first visual feature, in the first set of visual features and associated with a first timestamp in the primary video stream, with the first visual content trigger in Block S122; retrieving the first resource according to the first configuration in Block S123; fusing the primary video stream and the first resource into a first composite video according to the first configuration, the first composite video containing the first resource proximal the first timestamp in Block S130; and publishing the first composite video to the second video platform in Block S135. This variation of method S100 further includes: at a second time, detecting a second set of visual features in the primary video stream in Block S141; correlating a second visual feature, in the second set of visual features and associated with a second timestamp in the primary video stream, with the second visual content trigger in Block S142; retrieving the second resource according to the second configuration in Block S143; fusing the first composite video and the second resource into a second composite video according to the second configuration, the second composite video containing the second resource proximal the second timestamp in Block S145; and publishing the second composite video to the second video platform in Block S150.

1.1.2 Second Variation

Figure 4:
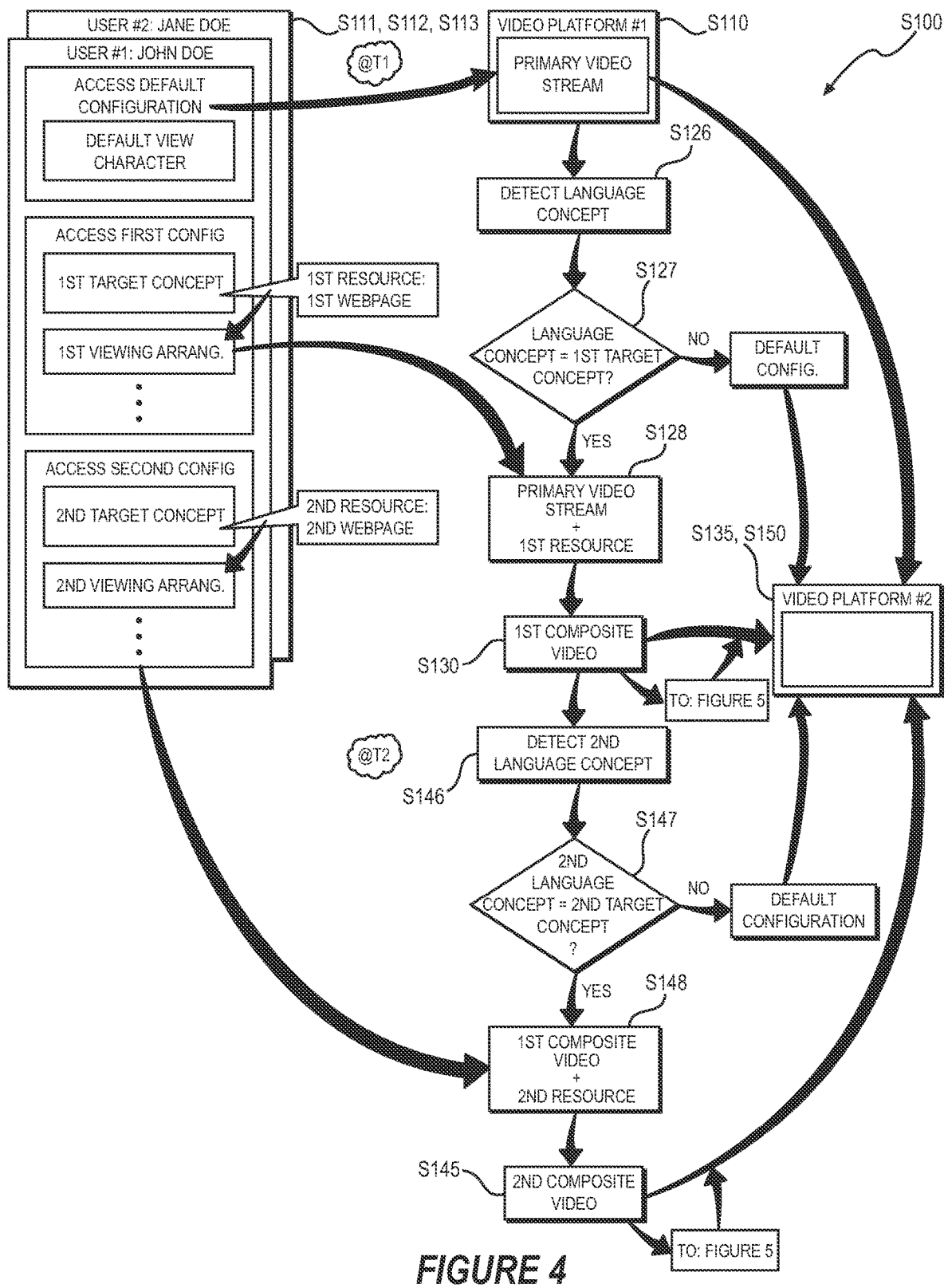
FIG. 4 is a schematic representation of one variation of the first method.

As shown in FIG. 4, another variation of the method S100 includes: for a first streaming event associated with a first user, accessing a default configuration defining a default set of viewing characteristics in Block Sill; accessing a first audio configuration defining a first target concept linked to a first resource at a first webpage, and a first viewing arrangement of visual content of a primary video stream and the first resource in Block S112; and accessing a second audio configuration defining a second target concept linked to a second resource at a second webpage, and a second viewing arrangement of visual content of the primary video stream and the second resource in Block S113. This variation of method S100 further includes: accessing a primary video stream comprising an audio stream, recorded by a remote computing device associated with the first user, from a first video platform; and, at an initial time, streaming the primary video stream to a second video platform according to the default configuration.

This variation of the method S100 further includes: at a first time, detecting a first language concept in the audio stream of the primary video stream in Block S126; correlating the first language concept, associated with a first timestamp in the primary video stream, with the first target concept in Block S127; retrieving the first resource according to the first configuration in Block S128; aggregating the primary video stream and the first resource into a first composite video according to the first audio configuration, the first composite video containing the first resource proximal the first timestamp in Block S130; and publishing the first composite video to the second video platform in Block S135. This variation of method S100 further includes: at a second time, detecting a second language concept in the audio stream of the primary video stream in Block S146; correlating the second language concept, associated with a second timestamp in the primary video stream, with the second target concept in Block S147; retrieving the second resource according to the second configuration in Block S148; fusing the first composite video and the second resource into a second composite video according to the second configuration, the second composite video containing the second resource proximal the second timestamp in Block S145; and publishing the second composite video to the second video platform in Block S150.

1.2 Applications

Generally, the computer system can execute the method S100 to: access configurations defining viewing arrangements of audio-visual content; detect trigger events in video streams; and automatically organize visual content according to the viewing arrangements based on the trigger events.

Generally, the computer system can access content arrangement configurations for streaming events associated with users. In one example, the streaming event can be a remote academic lecture associated with a professor or faculty member affiliated with a university. In another example, the streaming event can be a sporting event associated with a commentator. In yet another example, the streaming event can be a virtual legal trial associated with an attorney or a judge. More specifically, for a first user, the computer system can access a content arrangement configuration defining: a default viewing arrangement defining a default set of viewing characteristics; and a set of trigger events, each linked to a target viewing arrangement of audio-visual. The computer system can then access a set of video streams from an online video platform. More specifically, the computer system can access: a primary video stream associated with the user, and a secondary video stream from a first online video platform (e.g., streaming concurrently to the primary video stream). For example, in an academic setting, the computer system can access: a live stream of the professor (e.g., instructing the course) associated with the course; and a screen view of a presentation concurrently displayed by the professor or a video feed of a student in a virtual classroom for the course. In this example, at an initial time, the computer system can combine the primary video stream and the secondary video stream according to the default viewing arrangement. Thus, the computer system can publish the default viewing arrangement of the primary and secondary video streams to a second video platform until the computer system detects a trigger event in the video stream or the audio feed.

In one implementation, the computer system can generate a composite video responsive to detecting a trigger event in the primary and/or secondary video streams. For example, at a first time during the video streams, the computer system can detect an audio-visual trigger event in the primary video stream, such as: a gesture made by the user (e.g., a wave); a target word or phrase spoken by a specific individual (e.g., the professor, the commentator); a target concept appearing in the video stream (e.g., "World War II"). In response to detecting the trigger event, the computer system can: combine (or organize) the video streams into a composite video according to the first target viewing arrangement associated with the first trigger event. More specifically, in response to detecting the phrase "Happy Birthday to John Doe" in the primary video stream, the computer system can automatically arrange the primary video stream and the secondary video stream into a split screen arrangement of the professor and the target individual (e.g., John Doe). In this example, the computer system can then publish the first composite video to a second video platform—different from the first video platform —approximately concurrently with the primary video stream. In this example, the second video platform can be a streaming platform associated with a student profile. In one implementation, at a second time during the first streaming event, the computer system can combine the primary and secondary video streams according to an alternate viewing arrangement associated with a second trigger event—to generate a second composite video—responsive to detecting the second trigger event. Thus, for each instance that the computer system detects a trigger event in a video stream (e.g., the primary video stream, the secondary video stream) and combines the video streams according to a target viewing arrangement based on the corresponding trigger event, the computer system can automatically update the second video platform with the current composite video to accurately reflect the first configuration for the user.

Generally, the computer system can execute the method S100 to: access configurations defining visual content triggers and/or language concepts, and viewing arrangements of web-based resources and audio-visual content; and, based on detection of the visual content triggers and/or language concepts in a video stream, retrieve the web-based resources and generate composite videos by aggregating the web-based resources with the video stream according to viewing arrangements for publication to a video platform.

In one implementation, the computer system can access default and visual configurations for streaming events associated with the user. For example, for a first streaming event associated with a first user, the computer system can access a set of visual configurations. More specifically, each visual configuration can define a visual content trigger linked to a set of web-based resources, and a viewing arrangement of visual content of a video stream and the set of resources. For example, a visual configuration can define a visual content trigger (e.g., an image frame in the video stream), such as: a target individual (e.g., an athlete, a celebrity); a target concept (e.g., an equation, a book title); a target object (e.g., a vehicle type, a weapon), etc. In this example, each visual content trigger can be linked to a set of web-based resources, such as: a URL linked to a webpage; or a web-based media (e.g., an image, a video, literary content, a calendar). Thus, the computer system can stream web-based content to video platforms during a streaming event responsive to detecting visual-based trigger events related to the specific web-based content.

In one implementation, the computer system can detect a visual content trigger in a video stream. For example, the computer system can: access a primary video stream—from a first online video platform—recorded by a remote compute device; and, at an initial time, stream the primary video stream to a second video platform according to the default configuration. In this example, the computer system can: detect a set of visual features in the primary video stream; and correlate a visual feature—in the set of visual features—with a first visual content trigger. The computer system can then retrieve the first web-based resource according to the first configuration; and fuse the primary video stream and the first resource into a first composite video. In one example, during an academic lecture, the computer system can: detect the phrase "course syllabus" in an image frame of a video stream conducted by a professor (e.g., a slide deck presentation). In this example, the computer system can: retrieve a set of resources; and fuse the resources with the primary video stream according to a viewing arrangement to generate a composite video. More specifically, the computer system can retrieve a set of web-based resources, such as: a URL to a course specific webpage including the course syllabus; an image of a virtual calendar associated with the professor; a webpage to a teaching assistant's profile, etc. The computer system can then publish the composite video to a second video platform—different than the first video platform—such as, an online video platform affiliated with the academic institution. Thus, for each instance that the computer system detects a visual trigger event, the computer system can generate a new composite video, including the corresponding resource, according to a viewing arrangement; and update the second video platform to reflect a current video composite.

In one implementation, the computer system can access default and audio configurations for streaming events associated with the user. For example, for a second streaming event associated with the first user, the computer system can access a set of audio configurations. More specifically, each audio configuration can define a language concept linked to a set of web-based resources, and a viewing arrangement of visual content of the video stream and the set of resources. For example, an audio configuration can define a term and/or phrase of a target concept, such as: a target name (e.g., "John Doe"); a target entity (e.g., a team name, a company title); a historical event; a legal citation, etc. In this example, each target concept can be linked to a set of web-based resources, such as: a URL linked to a webpage; or a web-based media (e.g., an image, a video, literary content, a calendar). Thus, the computer system can stream web-based content to video platforms during a streaming event responsive to detecting audio-based language concepts related to the specific web-based content.

In one implementation, the computer system can detect a language concept in a video stream. For example, the computer system can: access a primary video stream—from a first online video platform—including an audio stream; and, at an initial time, stream the primary video stream to a second video platform according to the default configuration. In this example, the computer system can detect a first language concept in the audio stream of the primary video stream. The computer system can then: correlate the first language concept with the first target concept of the audio configuration; retrieve the first web-based resource according to the first configuration; and fuse the primary video stream and the first resource into a first composite video. In one example, during the academic lecture, the computer system can detect the professor speaking the phrase "course syllabus" in the audio stream associated with the professor. In this example, the computer system can: retrieve the set of resources, such as the URL to the first webpage including the course syllabus, and/or the image of a virtual calendar associated with the professor; and fuse the resources with the primary video stream according to a viewing arrangement to generate a composite video. In another example, during a sporting event, the computer system can detect a first language concept (e.g., "player number 17") in the audio stream associated with the first commentator. In this example, the computer system can: correlate the first language concept with the target language concept according to the audio configuration; and retrieve a resource, such as an image of the team roster, and/or an image of the player. The computer system can then fuse the resource with the primary video stream according to a viewing arrangement associated with the audio configuration to generate a second composite video. The computer system can then publish the composite video to a second video platform (e.g., a sports streaming platform). Thus, for each instance that the computer system detects a language concept in an audio stream associated with a streaming event, the computer system can generate a new composite video, including the corresponding web-based resource, and update the second video platform to reflect a current video composite.

1.3 Visual Content Organization: Viewing Arrangement Configurations

Figure 2:
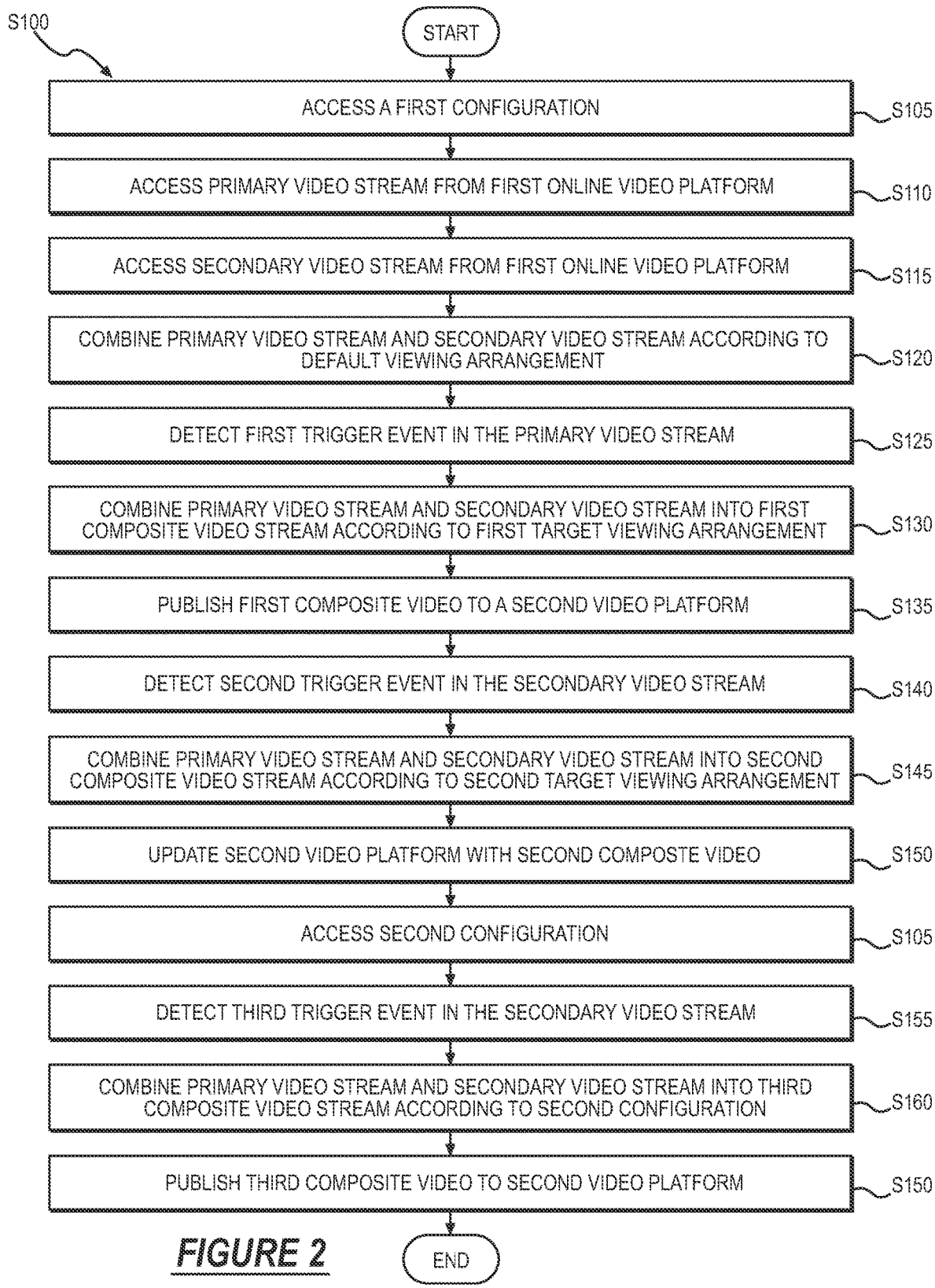
FIG. 2 is a flowchart representation of an example implementation of the first method.

Generally, as shown in FIGS. 1 and 2, the computer system can: access configurations defining target viewing arrangements; access video streams, including unique video content, from online video platforms; in response to detecting first trigger events in the video streams, aggregate the video streams into video compositions according to first target viewing arrangements specified by the configurations; and update the video compositions according to second target viewing arrangements, in response to detecting second trigger events in the video streams.

In one implementation, the computer system can derive user-specific configurations for particular streaming events defining: a default viewing arrangement; and a set of target viewing arrangements based on trigger events in Block S105. In particular, the computer system can: access a first configuration for a first streaming event associated with a first user. For example, the computer system can: access a first configuration for a streaming event, such as: a remote academic lecture; a sporting event; a legal court trial; and/or a video game live stream. In this example, the first streaming event can be associated with a user, such as: a professor, a commentator, an attorney, and/or a gamer recording an AV livestream via an online video platform or virtual browser. More specifically, the computer system can access the first configuration defining: a default viewing arrangement defining a default set of viewing characteristics; a first trigger event linked to a first target viewing arrangement defining a first set of viewing characteristics different from the default set of viewing characteristics; and a second trigger event linked to a second target viewing arrangement defining a second set of viewing characteristics different from the first set of viewing characteristics. For example, the first configuration can define a visual trigger event, such as: the user leaving a field of view of a camera; a target object entering the field of view of the camera (e.g., a student, an athlete); a target action (e.g., raising a hand). In this example, the first trigger event (e.g., visual trigger event) can be linked to a first target viewing arrangement defining a first set of viewing characteristics, such as: a first combination of window sizes (e.g., depicting the user, the set of viewers, a presentation mode); a first combination of window locations within the viewing screen; a first location of a chat box window; and/or a first set of locations of a set of captions. In this example, the first configuration can define an audio trigger event, such as: a trigger term or phrase (e.g., "Goodbye," "Any questions?"); and/or a trigger sound (e.g., a timer alarm). In this example, the second trigger event (e.g., audio trigger event) can be linked to a second target viewing arrangement defining a second set of viewing characteristics, such as: a second combination of window sizes; a second combination of window locations within the viewing screen; a second location of a chat box window; and/or a second set of locations of a set of captions.

In one variation, the computer system can derive streaming event-specific configurations for particular streaming events associated with a user. For example, for a first streaming event, the computer system can access: a first configuration defining a first visual content trigger linked to a first resource; and a first viewing arrangement of visual content of a primary video stream and the first resource. In this example, for a second streaming event, the computer system can access: a second configuration defining a second visual content trigger linked to a second resource; and a second viewing arrangement of visual content of the primary video stream and the second resource in Block S105. In this example, the professor can be associated with a first streaming event (e.g., a Calculus course including 20 students), and a second streaming event (e.g., an Algebra course including 100 students). In this example, the computer system can access the configuration associated with the streaming event based on a time of day corresponding to the streaming event. For example, for the user, the computer system can access: a first time (e.g., 1:00 pm) associated with a first streaming event (e.g., the Calculus course); and a second time (e.g., 5:00 pm) associated with a second streaming event (e.g., the Algebra course). In this example, the computer system can access: a first configuration associated with the first streaming event at the first time; and a second configuration associated with the second streaming event and at the second time. Thus, the computer system can automatically access configurations for various streaming events associated with the user when the user initiates a streaming event at a target time.

1.3.1 Video Stream

In one implementation, as shown in FIGS. 1 and 2, the computer system can access multiple video streams—each capturing a unique set of video content—during the streaming event in Blocks S110 and S115. More specifically, for the first streaming event associated with the first user, the computer system can access: a primary video stream comprising a first set of video content, from a first online video platform; and a secondary video stream including a second set of video content from the first online video platform (or a second online video platform). For example, the computer system can access a primary video stream of the user including a first set of video content, such as a livestream of the user (e.g., a professor, a lecturer). The computer system can also access a secondary video stream including a second set of video content, such as a live feed of a viewer (e.g., student), from the first online video platform (or a second online video platform). In one variation, the computer system can access additional video streams including a third set of video content, such as: a screen recording of a presentation; a live feed of a second viewer; a news broadcast; a pre-recorded video. In this example, the online video platform can be associated with: the user (e.g., a personal profile or account); an entity (e.g., a university, a company); or a generic online video platform (e.g., a browser).

1.3.2 Default Arrangement

In one implementation, as shown in FIGS. 1 and 2, the computer system can aggregate the video streams according to the default viewing arrangement in Block S120. For example, at an initial time, the computer system can combine the primary video stream and the secondary video stream according to the default viewing arrangement. More specifically, upon initiating each streaming event—associated with the user—the computer system can: automatically arrange the primary and secondary (and additional) video streams according to the default set of viewing characteristics. In this example, the default set of viewing characteristics can include: a default set of window sizes (e.g., the user in a largest viewing window); a default set of window locations within the viewing window (e.g., a default split-screen arrangement); and/or a default location of a chat box. Thus, the computer system can arrange the video content of the video streams based on default parameters until the computer system detects a trigger event during the streaming event.

1.3.3 Trigger Event Detection+Composition Generation

In one implementation, the computer system can generate video compositions according to viewing arrangements defined by configurations responsive to detecting trigger events in the video streams. For example, at a first time, the computer system can: detect the first trigger event in the primary video stream in Block S125; and, in response to detecting the first trigger event, combine the primary video stream and the secondary video stream into a first composite video according to the first target viewing arrangement in Block S130. In this example, at a second time, the computer system can: detect the second trigger event in the secondary video stream in Block S140; and, in response to detecting the second trigger event, combine the primary video stream and the secondary video stream into a second composite video according to the second target viewing arrangement in Block S145.

For example, at the first time, the computer system can: detect a first visual trigger event by the user (e.g., a professor) in the primary video stream, such as: absence of the user in the user feed. In response to detecting absence of the user in the user feed, the computer system can aggregate the primary video stream of the user feed and the secondary video stream (e.g., associated with a first student) into a first composite video according to the first target viewing arrangement. In this example, at the second time, the computer system can then: detect a second visual trigger event by the user in the secondary video stream, such as: presence of the user in the user feed; or the user making a gesture. In this example, in response to detecting the second visual trigger event, the computer system can aggregate the primary video stream and the secondary video stream into a second composite video according to the second target viewing arrangement. In another example, the computer system can aggregate the primary video stream and the secondary video stream into a composite video according to a target viewing arrangement, in response to detecting an audio trigger event by the user in the primary video stream. In one variation, the computer system can aggregate the primary video stream and the secondary video stream into a composite video according to a target viewing arrangement, in response to detecting a trigger event (e.g., audio, visual) in the secondary video stream in Block S155. For example, the computer system can aggregate the primary video stream and the secondary video stream into a composite video according to a target viewing arrangement in Block S160, in response to detecting a trigger event by a viewer in the secondary video stream associated with the viewer, such as: a student; and/or a presentation. Therefore, the computer system can automatically fuse video streams according to viewing arrangements based on trigger events associated with those viewing arrangements.

1.3.4 Composition Publication+Update

In one implementation, the computer system can publish (or stream) the composite video to a video platform and update the video composite at the video platform responsive to detecting subsequent trigger events in Blocks S135 and S150. More specifically, at the first time, the computer system can: publish the first composite video to a second video platform, different from the first video platform. For example, the computer system can publish the first composite video to a different video platform associated with the user, such as: a university portal associated with a class; and/or a student-specific portal. In this example, at the second time, the computer system can update the first composite video with the second composite video published to the second video platform. For example, in response to aggregating the primary video stream and the secondary video stream into a composite video according to the second viewing arrangement, the computer system can update (or replace) the first composite video published to the second video platform with the second composite video.

In one variation, the computer system can publish the composite video to a set of video platforms approximately concurrently with the primary video stream. More specifically, at the first time, the computer system can: publish the first composite video to the second video platform, different from the first video platform, approximately concurrently with the primary video stream. In particular, the computer system can publish the first composite video to the second platform within two seconds of the primary video stream. For example, the computer system can: publish the first composite video to a second video platform associated with a student in a set of students; and, at the second time, update the first composite video with the second composite video at the second video platform associated with the student. Thus, for each instance that the computer system detects a trigger event in a video stream and aggregates the video streams into a composite video, the computer system can automatically stream the composite video to the second video platform.

1.4 User On-Boarding

In one implementation, the computer system can access default configurations for a new user during an on-boarding process. For example, during an onboarding process, the computer system can access a set of generic configurations (e.g., visual, audio). The computer system can then generate a prompt to the user to populate a set of configuration features, such as: visual content triggers; a set of resources; viewing arrangements; a target video stream. In this example, the computer system can prompt the user to populate unique configuration features for a set of streaming events (e.g., courses, athletic events, gaming streams) associated with the user. Thus, the computer system can access a set of configurations associated with a specific user and automate alteration of configurations and/or configuration features for particular streaming events.

1.5 Video Feature Configurations

Generally, as shown in FIG. 3, the computer system can: access configurations defining visual content triggers; detect visual features in video streams associated with the visual content triggers; retrieve resources linked to the configurations; and aggregate the resources with the video streams to generate composite videos.

In one implementation, for a streaming event, the computer system can access a set of configurations associated with a user in Blocks S106, S107, and S108. For example, for a first streaming event associated with a first user, the computer system can access a default configuration defining a default set of viewing characteristics. In this example, the computer system can access: a first configuration defining a first visual content trigger linked to a first resource; a first viewing arrangement of visual content of a primary video stream and the first resource; a second configuration defining a second visual content trigger linked to a second resource; and a second viewing arrangement of visual content of the primary video stream and the second resource. In particular, a visual content trigger can be an image frame in a video stream including: a target individual (e.g., an athlete); a target object (e.g., a vehicle type, a cosmetic product); a target text (e.g., a name, a book title); and/or a target feature (e.g., a color, a pattern).

In one variation, the computer system can access different configurations during different periods of time for the first user. For example, for a first professor instructing a course, the computer system can: access a first configuration—including a first set of resources—during a first period of time (e.g., a first part of a semester); and, upon expiration of the first period of time, access a second configuration—including a second set of resources—during a second period of time (e.g., a second part of the semester). In another example, for a second professor instructing a first course, the computer system can: access a first configuration—including a first set of resources—on a first set of days in a week (e.g., Tuesday, and Thursday); and access a second configuration—including a second set of resources—on a second set of days in the week (e.g., Monday, and Wednesday). In this example, the computer system can automatically adopt a configuration and features (e.g., visual content triggers, resources, viewing arrangements) corresponding to the configuration based on a time period associated with the configuration. Thus, the computer system can reduce manual configuration of resources by the user by automatically retrieving different configurations associated with the user based on different periods of time.

1.5.1 Resources

Generally, the computer system can access configurations including visual content triggers linked to a set of resources. In one implementation, the computer system can access a first configuration defining a first visual content trigger linked to a first resource; and access a second configuration defining a second visual content trigger linked to a second resource. In this implementation, the resource can be a web-based resource, such as: a URL link to digital content (e.g., a webpage, an image, a video); a set of text (e.g., legal statute, an equation, a roster) from a webpage; and/or a video stream (e.g., a live video feed of a viewer) from a webpage. Thus, the computer system can stream web-based content to video platforms during a streaming event responsive to detecting visual-based trigger events related to the specific web-based content.

In one variation, the computer system can access a resource from a set of resources associated with a particular user. For example, the computer system can: access a first resource from a first set of resources configured for a first user; and select a second resource from a second set of resources configured for a second user. In this example, the user can be: a professor; an attorney; a commentator; a news anchor, etc. For example, for a first professor, the computer system can access a first configuration defining a first visual content trigger linked to a first URL. More specifically, the computer system can access the first configuration defining the first visual content trigger linked to a first webpage within a browser (e.g., a link to a calendar for the first professor). In this example, for a second professor, the computer system can: access a second configuration defining a second visual content trigger linked to a second resource. More specifically, the computer system can access the second configuration defining the second visual content trigger linked to a second webpage within the browser (e.g., a link to a calendar for the second professor). Thus, the computer system can derive a set of configurations including user-specific resources.

In one variation, the computer system can access a resource from a set of resources associated with a user based on a streaming event. For example, for a first user, the computer system can: access a first resource from a first set of resources configured for a first streaming event; and access a second resource from a second set of resources configured for a second streaming event. In this example, the first user can be associated with multiple streaming events such as: academic courses; sporting events; legal trials; online gaming tournaments, etc. For example, for a first professor, the computer system can access: a first configuration associated with a first streaming event of a first course (e.g., Calculus 1), and defining a first visual content trigger linked to a first resource (e.g., a link to a first syllabus); and a second configuration—defining a second visual content trigger linked to a second resource (e.g., a link to second syllabus)—associated with a second streaming event of a second course (e.g., Calculus 2). Thus, the computer system can access unique resources for multiple streaming events associated with individual users.

1.5.2 Viewing Arrangements

In one implementation, the computer system can access configurations defining viewing arrangements of visual content and resources. In particular, the computer system can access: a first configuration defining a first viewing arrangement of visual content of a primary video stream and the first resource; and a second configuration defining a second viewing arrangement of visual content of the primary video stream and the second resource. For example, the computer system can access: the first viewing arrangement characterizing the visual content of the primary video stream and a first location of the first resource relative the visual content of the primary video stream; and the second viewing arrangement characterizing the visual content of the primary video stream and a second location of the second resource relative the visual content of the primary video stream. In this example, the computer system can access: the first viewing arrangement specifying arrangement of the first resource along a bottom portion (e.g., bottom edge) of the visual content of the primary video stream; and the second viewing arrangement specifying arrangement of the second resource at a top, left-hand corner of the primary video stream. Thus, the computer system can aggregate resources and video content of video streams according to particular configurations and visual trigger events.

1.5.3 Video Stream Access+Default Streaming

In one implementation, the computer system can access a video stream from a video platform and publish the video stream to a different video platform according to default viewing parameters. In particular, the computer system can: access a primary video stream recorded by a remote compute device associated with the first user, from a first video platform (e.g., a first webpage) in Block S110. For example, the computer system can access a livestream of a sporting event—associated with a set of commentators—from an online video platform, such as: a streaming service; or a broadcasting network. In this example, the primary video stream can include an audio stream. At an initial time, such as upon access of the livestream, the computer system can: stream the primary video stream to a second video platform according to the default configuration. Thus, the computer system can stream the video stream according to the default configuration until the computer system detects a visual content trigger in the video stream.

1.5.4 Visual Feature Detection+Content Trigger Correlation

In one implementation, the computer system can detect features in a video stream and correlate the features with a visual content trigger associated with a configuration. In particular, at a first time, the computer system can: detect a first set of visual features in the primary video stream in Block S121. In this implementation, the computer system can detect visual features according to a set of target features for the streaming event. More specifically, the computer system can access: a first set of target features for a first streaming event; and a second set of target features for a second streaming event. For example, for the first streaming event of an athletic event, the computer system can access a first set of target features such as: a set of athlete numbers;

a team logo; a referee name; etc. In this example, for the second streaming event of a gaming stream, the computer system can: access a second set of target features, such as: a weapon type (e.g., a sword); a character; a structure (e.g., a castle); etc. In this example, the computer system can detect the visual features (e.g., the first set of visual features) in the primary video stream according to the target features for the streaming event. In response to detecting a first visual feature—in the first set of visual features—based on the set of target features for the streaming event, the computer system can then correlate the first visual feature with the first visual content trigger associated with the first configuration. In this example, at the second time, the computer system can then: detect a second set of visual features in the primary video stream in Block S141; and correlate a second visual feature—in the second set of visual features—with the second visual content trigger associated with the second configuration in Block S142.

In one implementation, the visual features can be associated with a timestamp in the video stream. In particular, the computer system can correlate: the first visual feature associated with a first timestamp in the primary video stream with the first visual content trigger; and the second visual feature associated with a second timestamp in the primary video stream with the second visual content trigger. Therefore, the computer system can retrieve accurate resources based on the correlation of the visual feature with the visual content trigger and according to a timestamp of the visual feature in the video stream.

1.5.5 Resource Retrieval+Composite Video Generation

In one implementation, the computer system can retrieve a resource based on a visual trigger and aggregate the resource and the video stream into a composite video according to a viewing arrangement defined by a configuration in Blocks S123, S130, S143, and S145. For example, at the first time, in response to correlating the first visual feature with the first visual trigger, the computer system can: identify the first resource based on the first visual content trigger; retrieve the first resource according to the first configuration; and fuse (or aggregate) the primary video stream and the first resource into a first composite video—containing the first resource proximal the first timestamp—according to the first configuration. In this example, at the second time, in response to correlating the second visual feature with the second visual content trigger, the computer system can: identify the second resource—different from the first resource—based on the second visual content trigger; retrieve the second resource according to the second configuration; and fuse the first composite video (or the primary video stream) and the second resource into a second composite video—containing the second resource proximal the second timestamp—according to the second configuration. Thus, for each instance that the computer system detects a visual feature and correlates the visual feature with a visual content trigger, the computer system can update the composite video according to a video arrangement associated with the visual content trigger.

In one implementation, the computer system can publish (or broadcast) the composite video to an online video platform for viewing in Blocks S135, and S150. For example the computer system can: at the first time, publish the first composite video to the second video platform; and, at the second time, publish the second composite video to the second video platform. In one variation, the computer system can stream a composite video (e.g., the first composite video, the second composite video) to a set of different video platforms according to the default configuration. For example, the computer system can publish: the first composite video to a first set of video platforms; and the second composite video to a second set of video platforms. More specifically, the first set of video platforms can be associated with a first set of viewers (e.g., a group of students), and the second set of video platforms can be associated with a second set of viewers (e.g., a group of academic faculty). In another variation, the computer system can stream the composite video to the first video platform. Thus, the computer system can access a video stream from a first video platform, aggregate the video stream with resources into a composite video—according to a viewing arrangement—based on visual triggers, and broadcast the composite video to an alternate set of video platforms.

1.5.6 Composite Video Transcoding

In one implementation, the computer system can transcode the composite video according to a target rendition in Blocks S170 and S171. For example, in response to fusing the primary video stream and the first resource into a first composite video, the computer system can: identify a target rendition for the first composite video; transcode the first composite video into a first target rendition (e.g., 720p); and publish the first composite video in a first target rendition to the second video platform. In this example, in response to fusing the first composite video (or the primary video stream) and the second resource into a second composite video, the computer system can: transcode the second composite video into the first target rendition; and publish the second composite video in the first target rendition to the second video platform.

In one variation, the computer system can transcode the composite video according to different target renditions based on the target video platform. For example, in response to fusing the primary video stream and the second resource into a second composite video, the computer system can: identify a first target rendition associated with a first video platform; transcode the second composite video into the first target rendition (e.g., 720p); and publish the second composite video in the first target rendition to the first video platform. In this example, the computer system can: identify a second target rendition associated with a second video platform; transcode the second composite video into the second target rendition (e.g., 1080p); and publish the second composite video in the second target rendition to the second video platform. Thus, the computer system can publish composite videos according to target renditions that are compatible with online streaming platforms.

1.5.7 Resource Removal

Figure 6:
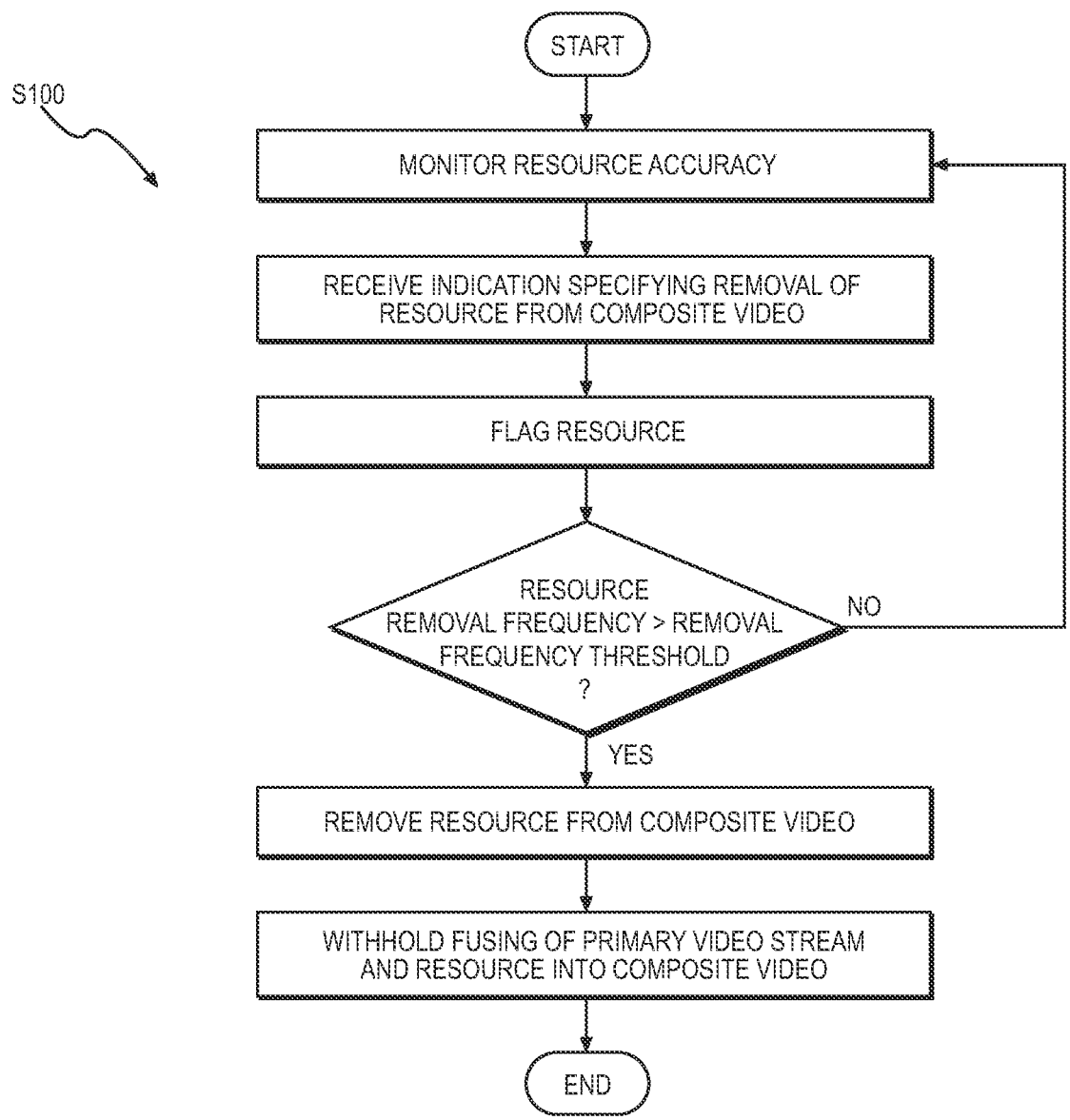
FIG. 6 is a flowchart representation of an example implementation of the first method.

As shown in FIG. 6, in one implementation, the computer system can flag and remove resources from composite videos responsive to receiving an indication from a user. For example, during a first time period of the primary video stream, the computer system can receive a removal request specifying removal of the first resource from the first composite video. In response to receiving the removal request, the computer system can: flag the first resource; record a time stamp associated with the removal request; and identify the visual trigger event associated with the first resource. The computer system can then monitor subsequent removal requests specifying removal of the first resource from the first composite video. During a second time period of the primary video stream, in response receiving a set of removal requests for the first resource at a resource removal frequency exceeding a removal threshold, the computer system can: remove the first resource from the first composite video; and withhold aggregation (e.g., fusing) of the primary video stream and the first resource into a composite video during a third time period of the primary video stream. In one variation, the computer system can: generate a notification specifying the first resource and the resource removal frequency for the first resource; and transmit the notification to the user associated with the configuration. Thus, the computer system can prompt investigation of the first resource, thereby reducing subsequent instances of aggregation of the first resource with the primary video stream responsive to receiving indications of removal of the first resource signifying potential inaccuracy.

1.5.8 Resource Organization+Configuration Recommendation

In one implementation, the computer system can identify a set of resources associated with a target content and derive configurations for the user based on the set of available resources. More specifically, the computer system can: receive a set of resources associated with the user; identify a first subset of resources—from the set of resources—corresponding to a first target content; and derive the first configuration defining the first visual content trigger linked to the first subset of resources associated with the first target content. The computer system can then: identify a second subset of resources—from the set of resources—associated with a second target content; and derive the second configuration defining the second visual content trigger linked to the second subset of resources associated with the second target content.

For example, the computer system can receive the set of ten resources associated with a professor (e.g., based on preferences for the professor) for an academic class. The computer system can then: identify a first subset (e.g., 5) of resources from the set of resources corresponding to the first target content; and derive the first configuration defining the first visual content trigger linked to the first subset of resources associated with the first target content. In this example, the first target content can be: a first equation; a chapter in a textbook; a first topic, etc. The computer system can then: identify a second subset (e.g., 5) of resources from the set of resources—that are different from the first subset—associated with a second target content, such as: a second equation; a second chapter in a textbook; and/or a second topic. The computer system can then derive the second configuration defining the second visual content trigger linked to the second subset of resources associated with the second target content.

In this implementation, the computer system can prioritize a resource for a subsequent configuration based on an access frequency for the resource during a video stream. For example, at the first time, in response to detecting retrieval of a first resource in the first subset of resources at a first resource access frequency exceeding a resource access threshold, the computer system can prioritize the first resource within the first subset of resources. In this example, in response to detecting access to a second resource in the second subset of resources at a second resource access frequency falling below the resource access threshold, the computer system can: deprioritize the second resource; and remove the second resource from the second set of resources. Thus, the computer system can generate a recommendation for a resource for a subsequent streaming event and/or configuration based on a priority of that resource or reduce computational expenditure in maintaining the resource when the computer system fails to access or retrieve the resource above the resource access threshold.

In another implementation, the computer system can recommend configurations—associated with other streaming events—for subsequent streaming events responsive to identifying resources between the configurations. More specifically, for a second streaming event, the computer system can access a third configuration defining: a third visual content trigger linked to a third resource; and a third viewing arrangement of visual content of a secondary video stream and the third resource. The computer system can then: characterize a difference between the third resource and the second resource of the second configuration; and, in response to the difference between the third resource and the second resource falling below a difference threshold, generate a recommendation specifying access to the second configuration, and deliver the recommendation to the first user. In response to the difference between the third resource and the second resource exceeding the difference threshold, the computer system can adopt the third configuration.

For example, for a second academic lecture stream, the computer system can access a third configuration. The third configuration can define a third visual content trigger linked to a third resource corresponding to a target content (e.g., a first URL linked to a first webpage describing a first historical event), and a third viewing arrangement of visual content of the second academic lecture stream and the third resource. In this example, the computer system can: characterize a difference between the third resource and the second resource corresponding to the target content (e.g., a second URL linked to a second webpage describing the first historical event) of the second configuration. In response to the difference between the third resource and the second resource falling below a difference threshold, the computer system can: generate a recommendation specifying access to the second configuration based on the similarity between the second and third resource; and deliver the recommendation to the first user. Thus, the computer system can detect similarities between resources—and content associated with the resources—of multiple configurations to recommend configurations for subsequent streaming events.

In one variation, the computer system can access a configuration including a set of ranked resources. More specifically, the computer system can access a configuration including a set of resource ranked according to a criterion, such as: relevance; complexity; and/or bandwidth expenditure. For example, the computer system can: access a first configuration (e.g., audio, visual) defining the first target concept linked to a first set of resources ranked according to a first criterion. In this example, each resource in the first set of resources can be linked to a unique webpage including content associated with the first target concept. In one example, the computer system can rank the set of resources according to resource expenditure. Thus, the upon retrieval of a resource from the set of resources, the computer system can select a resource based on an available bandwidth to reduce computational expenditure. In another example, the computer system can rank the set of resources according to a complexity. For example, during a first instance of visual feature or language concept detection, the computer system can prioritize selection of a simple resource (e.g., a video, a schematic). During a subsequent instance of visual feature or language concept detection, the computer system can retrieve a resource of greater complexity (e.g., an article). Therefore, the computer system can automatically select resources based on rankings associated with the set of resources.

1.5.9 Visual Content Arrangement

In one implementation, the computer system can aggregate a composite video—including a resource—and a video stream according to a viewing arrangement responsive to detecting a trigger event in the video stream. For example, at a third time, the computer system can access a first content configuration defining a default viewing arrangement defining a default set of viewing characteristics, and a first trigger event (e.g., a visual trigger event) linked to a first target viewing arrangement defining a first set of viewing characteristics different from the default set of viewing characteristics. In this example, the computer system can then: access a secondary video stream including a second set of video content, from a third video platform (e.g., a live broadcast of a second user); and combine the second composite video and the secondary video stream according to the default viewing arrangement of the first content configuration. In this example, at a fourth time, in response to detecting the first trigger event in the secondary video stream (or the second composite video), the computer system can combine the second composite video and the secondary video stream according to the first target viewing arrangement of the first content configuration. More specifically, the computer system can combine the second composite video—including the second resource—and the secondary video stream according to the first target viewing arrangement of the first content configuration; and publish the second composite video and the secondary video stream according to the first target viewing arrangement to the second video platform. Thus, the computer system can organize composite videos and video streams (e.g., from other video platforms) according to various viewing arrangements based on trigger events in the video content.

1.6. Audio Feature Configuration

Generally, the computer system can access a set of audio configurations for a streaming event associated with a user. In one implementation, shown in FIG. 4, the computer system can: access a default configuration defining a default set of viewing characteristics in Block Sill; access a first audio configuration defining a first target concept linked to a first resource at a first webpage, and a first viewing arrangement of visual content of a primary video stream and the first resource in Block S112; and access a second audio configuration defining a second target concept linked to a second resource at a second webpage, and a second viewing arrangement of visual content of the primary video stream and the second resource in Block S113.

For example, for a first streaming event associated with a first user, the computer system can: access a default configuration defining a default (e.g., generic) set of viewing characteristics. In this example, the computer system can access: a first audio configuration defining a first target concept linked to a first resource at a first webpage, and a first viewing arrangement of visual content of a primary video stream and the first resource; and a second audio configuration defining a second target concept linked to a second resource at a second webpage, and a second viewing arrangement of visual content of the primary video stream and the second resource. In this example, the computer system can access a target language concept, such as: a name (e.g., a historical figure); a legal provision; a phrase (e.g., "Happy Birthday"), etc. Thus, the computer system can stream web-based content to video platforms during a streaming event responsive to detecting language concepts in audio streams and trigger organization of visual content according to viewing arrangements.

1.6.1 Language Concept Detection+Correlation

Generally, the computer system can detect a language concept in the audio stream and correlate the language concept to a target concept defined by a configuration. In one implementation, at a first time, the computer system can: detect a first language concept in the audio stream of the primary video stream in Block S126; and correlate the first language concept, associated with a first timestamp in the primary video stream, with the first target concept in Block S127. In this implementation, at a second time, the computer system can: detect a second language concept in the audio stream of the primary video stream in Block S146; and correlate the second language concept, associated with a second timestamp in the primary video stream, with the second target concept in Block S147.

In one implementation, at a first time, the computer system can detect a first language concept in the audio stream of the primary video stream. For example, during a sporting event, the computer system can detect a language concept, such as: a name of an athlete, a name of a team, and/or a type of play, etc. In another example, during a legal trial, the computer system can detect a language concept, such as: a legal provision (e.g., "35 U.S.C. Section 101"); a term (e.g., "Exhibit A"). In this example, the first language concept can be associated with a first timestamp in the primary video stream. The computer system can then correlate the first language concept, with the first target concept. In this example, at the second time, the computer system can then: detect a second language concept in the audio stream of the primary video stream; and correlate the second language concept, associated with a second timestamp in the primary video stream, with the second target concept. Thus, responsive to correlating the language concept in the audio stream of the primary video stream with a target concept associated with a configuration, the computer system can retrieve a resource based on the configuration.

1.6.2 Resource Retrieval+Composite Video Generation

Figure 5:
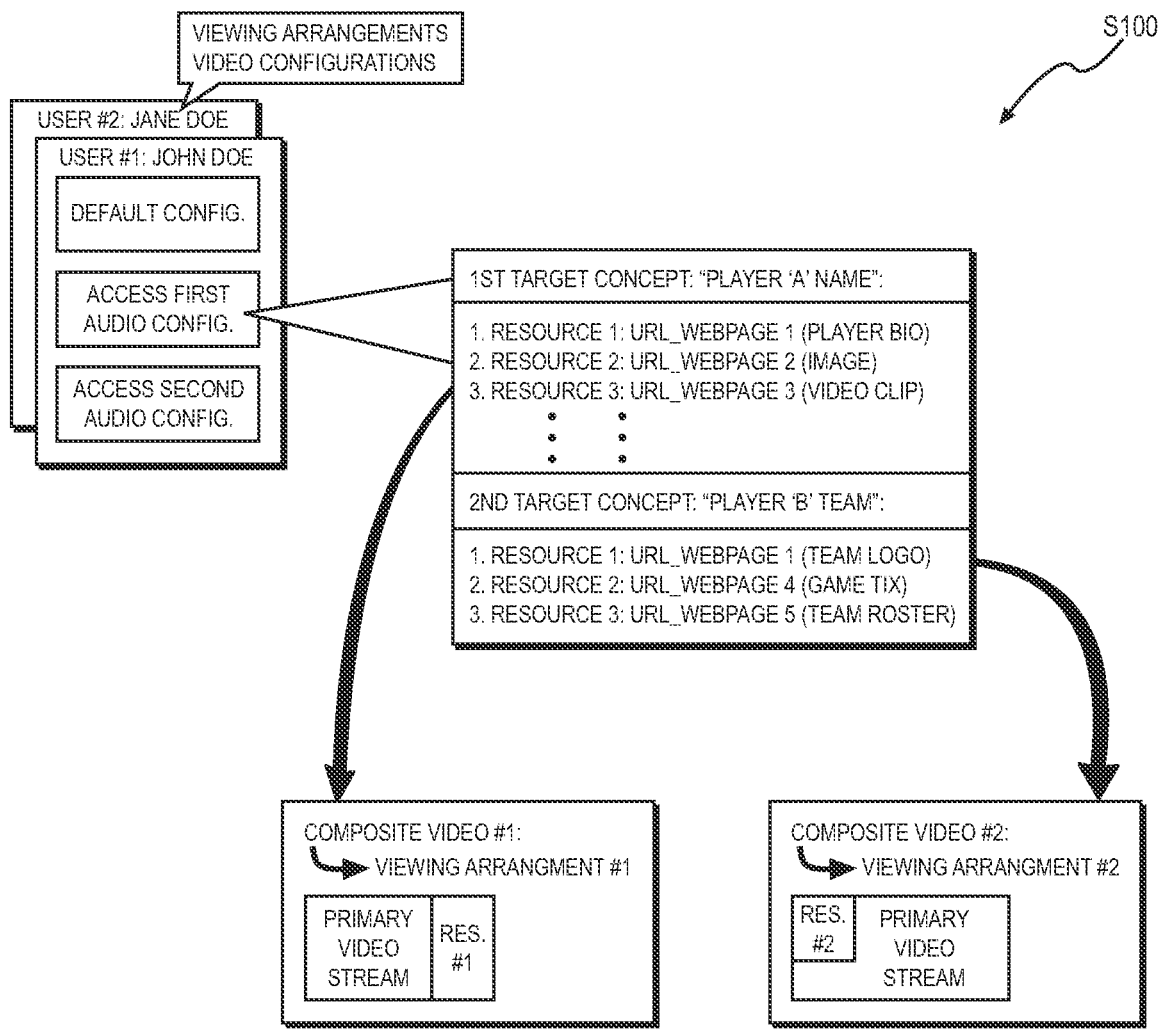
FIG. 5 is a schematic representation one variation of the first method.

Generally, the computer system can retrieve a resource based on a configuration in response to correlating a language concept in the audio stream associated with the primary video stream. In one implementation, shown in FIG. 4, the computer system can retrieve the first resource according to the first configuration in Block S128, and retrieve the second resource according to the second configuration in Block S148. As shown in FIG. 5, at the first time, the computer system can: retrieve the first resource according to the first configuration; and aggregate the primary video stream and the first resource into a first composite video according to the first audio configuration. More specifically, the computer system can: retrieve a first image associated with the first target concept from a first webpage; and aggregate the primary video stream and the first image based on the first viewing arrangement specified by the first configuration. In this example, the first composite video can contain the first resource (e.g., the first image) proximal the first timestamp. At the second time, the computer system can then: retrieve the second resource according to the second configuration; and fuse the first composite video and the second resource into a second composite video—containing the second resource proximal the second timestamp—according to the second configuration. More specifically, the computer system can: retrieve a first video associated with the second target concept from a second webpage; and aggregate the primary video stream and the first video based on the second viewing arrangement specified by the second configuration.

1.7 Latency-Based Configuration and Publication

In one implementation, the computer system can access a configuration according to a target latency. For example, the computer system can: characterize latencies, of a set of configurations (e.g., visual, audio); and set a threshold (e.g., maximum) latency for a streaming event. In this example, a configuration can exhibit a temporal latency proportional to a set of characteristics defining the configuration, such as: a number of trigger events defined by the configuration; a number of resources defined by the configuration; and/or a complexity of viewing arrangements defined by the configuration. The computer system can then: identify a subset of configurations that exhibit latencies below the threshold latency; select a target configuration from the subset of configurations; and deploy the target configuration for the streaming event. In this example, the computer system can increase a buffer time during access of the configuration to publish composite videos reduce buffering between publications when the computer system identifies a greater number of compute options associated with a configuration. Thus, the computer system can reduce computational expenditures for a streaming event by deploying a configuration that exhibits a low latency.

1.8 Example: Visual Content Organization

In one example, the computer system can execute the method S100 to automatically change organization of visual content for an academic lecture, such as in a remote classroom. In this example, the computer system can derive configurations for a set of administrators (e.g., professors, faculty members, students). More specifically, the computer system can derive a first set of configurations for a mathematics professor, and a second set of configurations for a history professor. Each configuration can define a set of trigger events including audio and/or visual cues, such as: a word or phrase (e.g., asking a question, stating a keyword); an action (e.g., the professor leaving the camera field of view, entering a screenshare mode). In this example, the computer system can associate each trigger event to a specific viewing arrangement defining of a set of viewing features. For example, in response to detecting the student asking a question of the professor, the computer system can define a split screen window arrangement between a particular student and the professor. In another example, the computer system can dynamically minimize a first window (e.g., video feed of the professor) and enlarge a second window (e.g., a video feed of a presentation) when the professor enters a "presentation" mode.

1.8.1 Example: Visual Feature Detection

In one example, the computer system can execute the method S100 to: automatically detect visual features in an athletic video stream; and retrieve resources associated with the visual features to generate composite videos. For example, for a streaming event of a basketball game associated with a first commentator, the computer system can access: a default configuration; and a first visual configuration defining a first visual content trigger, such as a player number, a referee, etc. Each target concept, such as a particular player number, can be linked to a set of resources, such as: a URL to a first webpage describing a biography of the player; an image of the player from a second webpage; a video segment of the player from a third webpage, etc. The computer system can then access a video stream of the basketball game from a first video platform (e.g., a sports broadcasting network). In this example, during the basketball game, the computer system can: detect visual features in the video stream of the basketball game; and correlate the visual features to the first visual content trigger, such as a target player. The computer system can then: retrieve a resource such as a roster of the team associated with the target player; aggregate the roster and the video stream into a first composite video; and broadcast the first composite video to a second video platform (e.g., a sports streaming service).

In another example, the computer system can execute method S100 to: automatically detect visual features during a video game stream; and retrieve resources associated with the visual features to generate composite videos. For example, for a streaming event of a video game (e.g., a first-person shooter game), the computer system can: access a default configuration; and a first visual configuration defining a first visual content trigger such as a weapon type (e.g., a rifle), a vehicle (e.g., a tank), a team player, etc. Each visual content trigger, such as a weapon type, can be linked to a set of resources, such as: an alternate image of the weapon from a first webpage; a URL to a second webpage describing the weapon; a video clip demonstrating loading the weapon; etc. In this example, the first configuration can further include a first viewing arrangement of the first resource and the first video stream. The computer system can then access the first video stream of the video game stream from a first video platform (e.g., a livestreaming service). In this example, during the video game stream, the computer system can: detect visual features in the video game stream; and correlate the visual features to the first visual content trigger. The computer system can then retrieve the resource associated with the first visual content trigger, such as the alternate image of the weapon; and aggregate the image and the video game stream into a first composite video according to the first viewing arrangement. In this example, the first viewing arrangement can define arrangement of the first resource in a bottom left-hand corner of the video stream. The computer system can then broadcast the first composite video to a second video platform (e.g., a streaming service).

1.8.2 Example: Audio Feature Detection

In one example, the computer system can execute the method S100 to automatically detect language concepts in audio feeds associated with video streams and retrieve resources associated with the language concepts to generate video composites. For example, for a first motorsport racing event associated with a first commentator, the computer system can access: a default configuration; and a first audio configuration defining a first set of target concepts, such as a set of driver names, a team name, a team coach, and/or a driver number. Each target concept, such as a particular driver name, can be linked to a set of resources, such as: a URL to a first webpage describing a biography of the driver; an image of the driver from a second webpage; a video segment of the driver from a third webpage, etc. In this example, the computer system can access the first audio configuration further defining a first viewing arrangement of visual content of a primary video stream and the first resource, such as an arrangement of the first resource in a top right-hand corner of the video stream. The computer system can then access a video stream of the motorsport racing event from a first video platform (e.g., a broadcasting network), including a first audio feed corresponding to the first commentator. In this example, during the motorsport racing event, the computer system can: detect a first language concept—a name of a driver—in the audio stream, such as "John Doe"; and retrieve a resource, such as an image from an official webpage, associated with the driver, "John Doe." The computer system can then: aggregate the image and the video stream into a first composite video according to the first viewing arrangement; and broadcast the first composite video to a second video platform.

In this example, a second commentator can be associated with the first motorsport racing event. For the second commentator, the computer system can access a second audio configuration defining a second set of target concepts (or the first audio configuration). In this example, the computer system can access user-specific audio configurations. In one variation, the computer system can access event-specific audio configurations. In this example, the computer system can access the second audio configuration defining a second set of target concepts, such as: a different set of driver names, a second set of team names, etc. The computer system can then: access the primary stream of the motorsport racing event including a second audio feed corresponding to the second commentator. In this example, during the motorsport racing event, the computer system can detect a second language concept in the second audio feed (e.g., a second team name). The computer system can then: correlate the second language concept with a target concept associated with the second configuration; and retrieve a second resource, such as a URL to a webpage associated with the second team. The computer system can then: aggregate the first composite video—based on the first commentator—and the second resource into a second composite video according to the first audio configuration; and publish the second composite video to the second video platform.

In another example, for a first virtual legal trial associated with an attorney, the computer system can access: a default configuration; and a first audio configuration defining a first set of target concepts, such as a legal provision (e.g., "35 U.S.C. Section 101"), an Exhibit type (e.g., "Exhibit A"), a party name (e.g., "the defendant"). Each target concept, can be linked to a set of resources, such as: a webpage reciting the provision; an image of the Exhibit, an image of the party, etc. The computer system can then access a live video stream of the legal trial from a first video platform, including an audio feed corresponding to the attorney. In this example, during the video stream, the computer system can: detect a first language concept—a legal statute—in the audio stream, such as "Federal Rules of Civil Procedure Rule 12"; and retrieve a resource, such as the recitation of the legal provision from an official webpage. The computer system can then aggregate the recitation and the video stream into a first composite video and broadcast the first composite video to a second video platform.

2. Second Method

Figure 7:
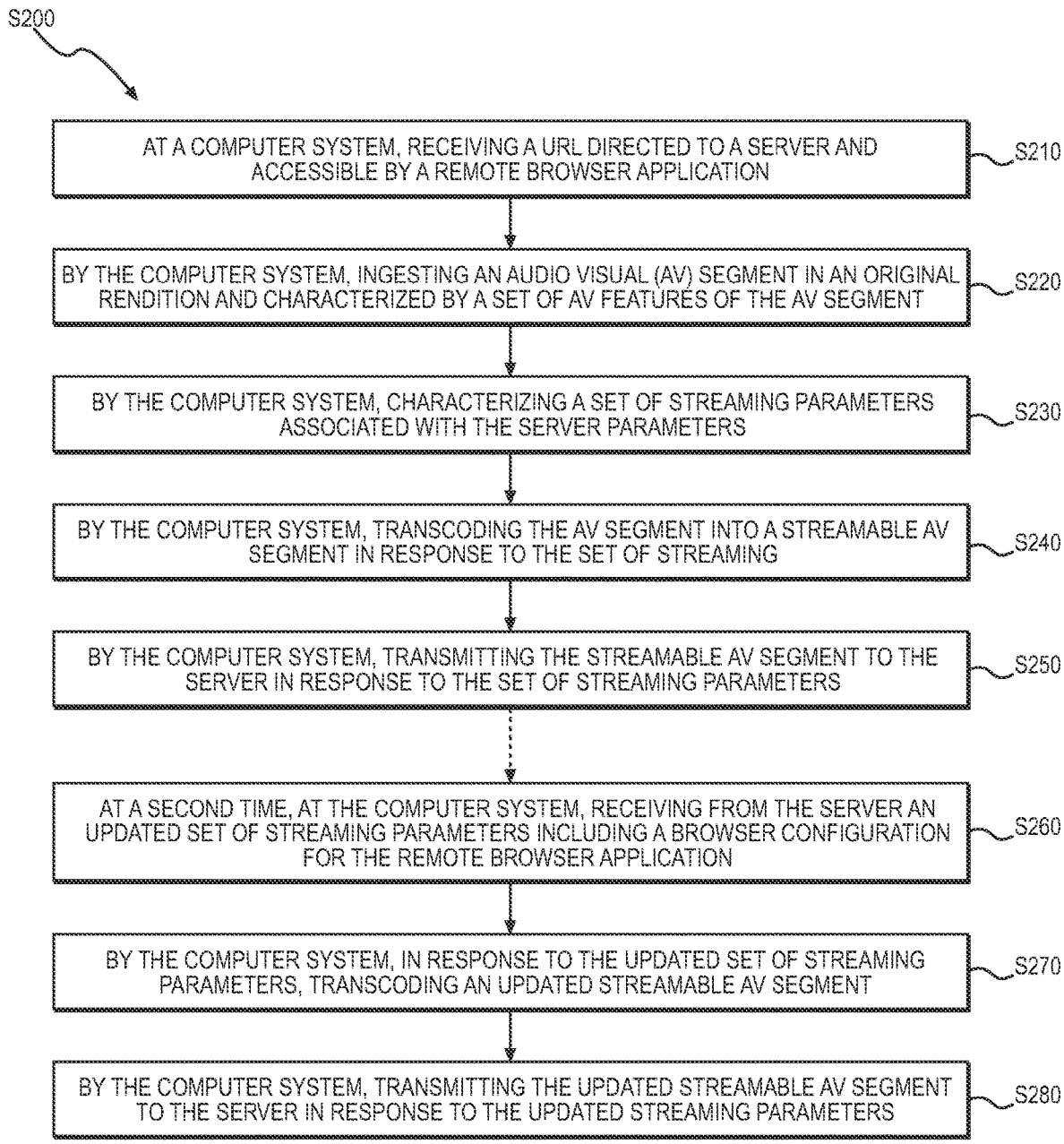
FIG. 7 is a flowchart representation of an example implementation of a second method.

As shown in FIG. 7, a second method S200 for audiovisual content broadcasting includes, at a computer system: ingesting audio visual (AV) content characterized by a set of AV features of the AV content in Block S220; and receiving a set of streaming parameters including a first browser configuration for a virtual browser application in Block S230. The method S200 can further include: transcoding the AV content into streamable AV content based on the set of streaming parameters in Block S240; and transmitting the streamable AV content to the virtual browser application in Block S250.

In one variation of the example implementation, the method S200 can also include, at a second time: at the computer system: receiving, an updated set of streaming parameters including a second browser configuration for the virtual browser application in Block S260; transcoding the streamable AV content into updated streamable AV content based on the updated set of streaming parameters in Block S270; and transmitting the updated streamable AV content to the virtual browser application in Block S280.

Figure 8:
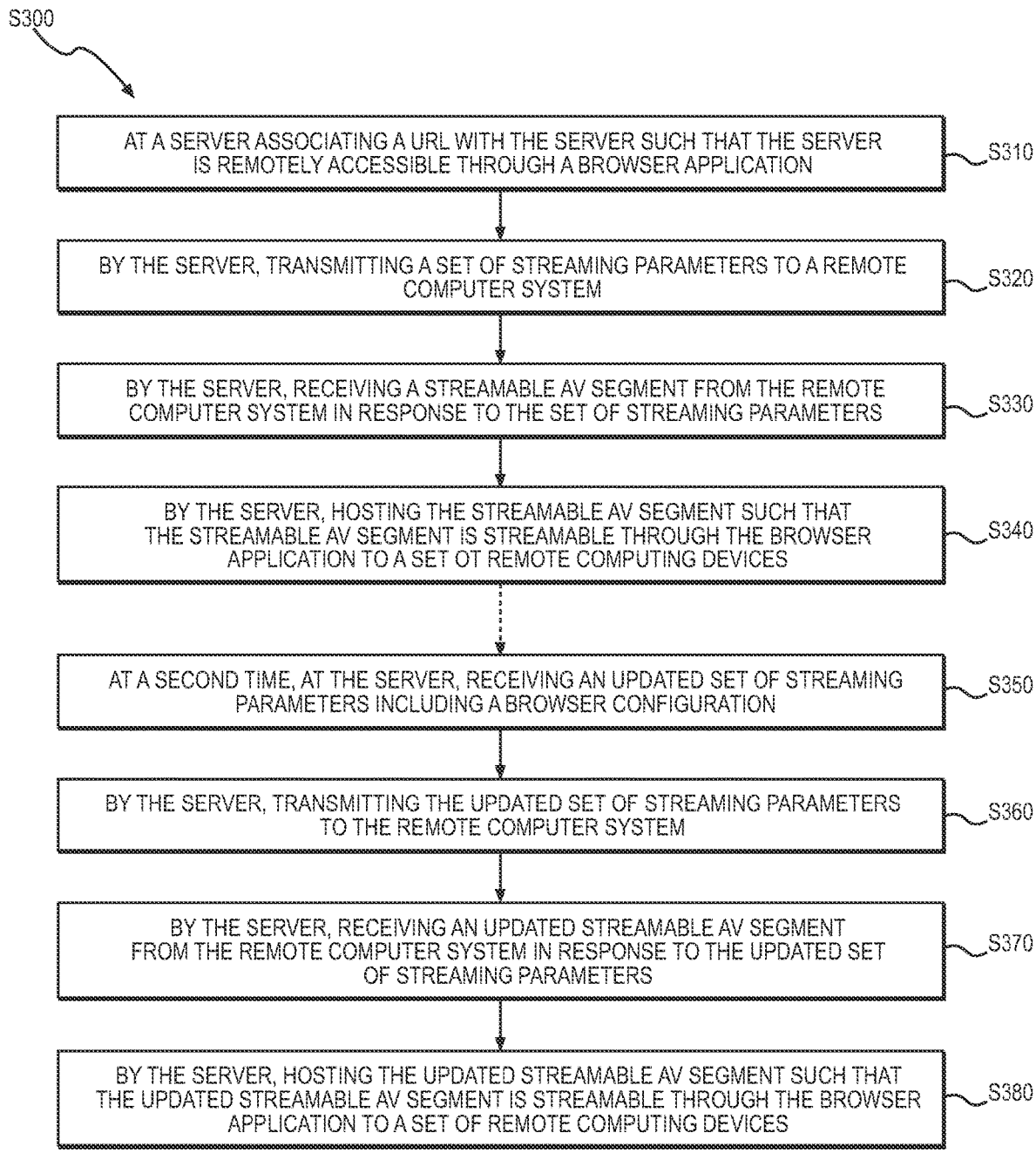
FIG. 8 is a flowchart representation of an example implementation of a third method.

As shown in FIG. 8, a third method for audiovisual content broadcasting can include: at a server, associating a URL with the server such that the server is remotely accessible through a virtual browser application in Block S310; by the server, transmitting a set of streaming parameters to a computer system (e.g., a remote computer system) in Block S320; by the server, receiving a streamable AV segment from the computer system in response to the set of streaming parameters in Block S330; and by the server, hosting the streamable AV segment such that the streamable AV segment is streamable through the virtual browser application to a set of remote computing devices in Block S340.

As shown in FIG. 8, the third method S300 can further include, at a second time: at the server, receiving an updated set of streaming parameters including a browser configuration in Block S350; by the server, transmitting the updated set of streaming parameters to the remote computer system in Block S360; by the server, receiving an updated streamable AV segment from the computer system in response to the updated set of streaming parameters in Block S370; and by the server, hosting the updated streamable AV segment such that the updated streamable AV segment is streamable through the virtual browser application to a set of remote computing devices in Block S380.

2. Architecture

Figure 9:
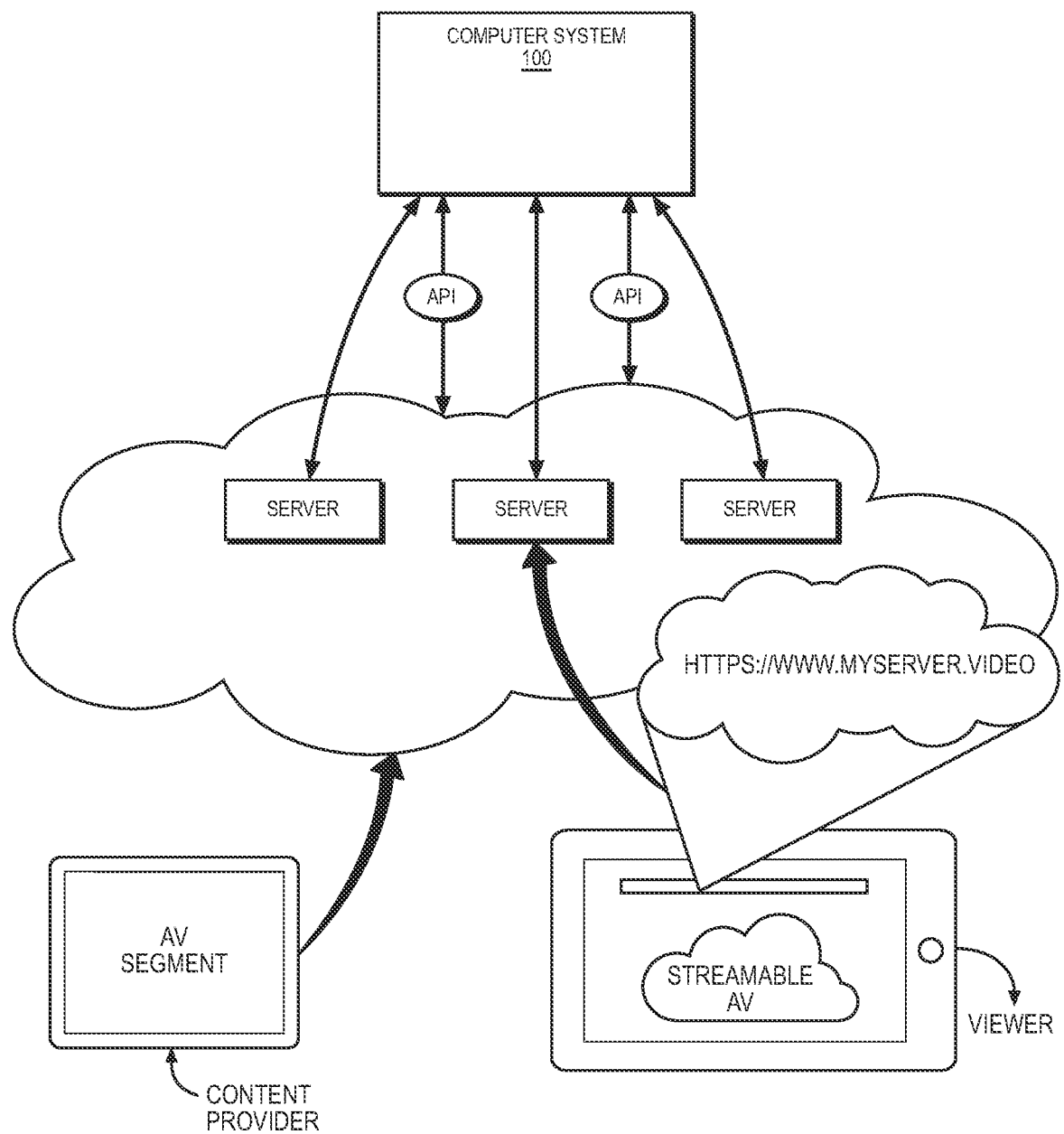
FIG. 9 is a schematic representation of an example implementation of an operating architecture.

As shown in FIG. 9, a computer system 100 can be configured within an operating environment or network architecture to execute Blocks of the methods S100, S200, and/or S300. For example, an architecture can include a computer system 100 (e.g., a set of computers, network of servers, local/remote proxy servers, databases) that is configured to access, receive, ingest, configure, and/or store AV segments, for example including portions of digital video data. The computer system 100 can include and/or be connected with another set of servers that are internet-facing and associated with and/or configured to be associated with one or more URL addresses.

As shown in FIG. 9, the computer system 100 and the server(s) can interface via an application programming interface configured to avail the server(s) of the AV processing and streaming methods and techniques executed by the computer system 100. The API layer can function to call between the server(s) and the computer system 100, via the URL address for example. In operation, a user viewing a website at the URL associated with the server through a local browser application may stream, view, modify, and/or otherwise interact with an AV segment processed and streamed from the computer system 100 through the server (s).

As shown in FIG. 9, a viewer/user may access the AV segment as rendered within a local browser application on a user device, such as a computer, laptop computer, smart phone, tablet, etc. Generally, the user may access the AV segment as a streamable AV segment, as transcoded and delivered by the computer system 100 to the user device through a server, accessible to the user device via a browser application. Moreover, as described in more detail below, the browser application can cooperate with the server to change, adjust, adapt, and/or modify the streamable AV segment in accordance with a set of streaming parameters associated with the browser.

3. Applications

Generally, the computer system 100 and/or server described herein can execute Blocks of the methods S100, S200 and/or S300 to generate, transmit, receive, manipulate, render, and distribute audiovisual (AV) content both from and in a browser application located on a remote client-viewer device. Traditional AV viewing is performed either through a dedicated AV viewing application or within an embedded portion of a webpage.

Example implementations of the computer system 100 and/or server execute Blocks of the methods S100, S200 and/or S300 functionally bypass the need for a proprietary viewer and/or embedded stream by capturing a composition of a webpage and any embedded AV content before transcoding, re-rendering, and broadcasting the webpage as a live AV streamable object. In one example, a set of users/viewers can initiate a hosted web-conference on a commercially available conferencing platform and then the computer system 100 and/or server can livestream the AV content of the web-conference by: ingesting AV content (live, delayed, recorded content); rendering the AV content into a viewable webpage via a virtual browser application; transcoding the viewable webpage to generate a live AV streamable object; associating a URL with the live AV streamable object; and permitting access to the URL to a set of local browser applications associated with third-party computing devices (e.g., broadcast viewers). In another example, the computer system 100 and/or server can initiate multiple virtual browsers, each rendering a different view of the viewable webpage (e.g., a horizontal view, a vertical view, or any view associated with a particular browser configuration). Therefore, a user of the computer system 100 and/or server can edit the appearance of the live AV streamable object by modifying the browser configuration of the virtual browser application, thereby leveraging the webpage's response to various browser configurations to modify AV content as desired by the user.

Additionally, example implementations of the computer system 100 and/or server can take advantage of the implicit dynamic environments permitted by browser applications. For example, the virtual browser application can change the layout, design, scale, skins, or other visual or AV content associated with the webpage based on the browser configuration of the virtual browser application. Accordingly, the computer system 100 and/or server can execute Blocks of the methods S100, S200 and/or S300 by: ingesting sets of streaming parameters that include webpage information and/or browser application view/display characteristics; adaptively and dynamically transcoding the AV content in response to any changes in the configuration of the webpage and/or browser configurations; and adaptively and dynamically rendering and serving the AV content for broadcast via the associated URL. In this way, the computer system 100 and/or server can readily provide scalable and customizable AV content creation, AV content revision, and AV content broadcast that builds upon the inherent dynamism of webpages and the browser applications with which the webpages interact.

As described below, the computer system 100 can execute Blocks of the methods S100, S200 and/or S300 in transcoding and broadcasting the associated webpages according to a just-in-time set of protocols. Upon uploading AV content for internet streaming, the computer system 100 can initially store only the original rendition of the AV content instead of storing all advertised renditions of the AV content in anticipation of a request for any of these renditions, thereby reducing storage costs for the intervening time between initial upload and initial request for the AV content. Furthermore, the computer system 100 can invest compute resources to transcoding AV content when a segment of this AV content is requested instead of pre-transcoding the AV content into multiple advertised renditions in preparation for a request, thereby reducing upfront transcoding costs and eliminating transcoding costs for those AV content that are uploaded to the computer system but never requested (e.g., AV content with zero views or zero live viewers).

Additionally, by enabling just-in-time transcoding of sub-segment parts of an AV segment, the computer system 100 can further reduce latency of a just-in-time transcoding process. For example, the computer system 100 can, in response to a playback request for AV content, transcode a single byterange-addressable part (instead of the whole AV segment) prior to beginning delivery of AV content to the AV player.

For example, when the computer system 100 executes the methods S100, S200 and/or S300 for AV content included in a broadcast livestream, the computer system 100 can directly reduce the latency between AV capture of the livestream and delivery to viewers of the livestream. For recorded AV broadcast content, the computer system 100 can reduce wait time for first-time viewers of the recorded broadcast AV content.

Generally, the computer system 100 can execute the methods S100, S200 and/or S300 with any webpage via a "virtual browser application" that imports or ingests AV content for display within a webpage rendered by the virtual browser application, thereby creating a composition of the AV content with other content in the rendered webpage. Thus, the virtual browser application can render interactive AV content streams including multiple feeds and/or perspectives of the rendered webpage, based on encoded behavior of the webpage and the browser configuration of the virtual browser application. The virtual browser application can include any browser application functionality including cookies and APIs and can render any webpage requested by the user and accessible to the virtual browser application via the internet.

4. Terminology

Generally, the methods S200 and S300 is described with respect to AV content, AV segments, and streaming parameters. The term "AV content" refers to an AV file uploaded to a cache maintained by the computer system or a dynamic AV livestream that is cached in an original rendition. The term "AV segment" (e.g., an HLS or LL-HLS segment) refers to a set of frames of the AV content (i.e., a Group of Pictures) including an I-frame, which the computer system can transcode independently of other segments of the AV file. The computer system can store each AV segment as a separate file within a "playlist" for delivery to an AV player (e.g., standalone AV player application or browser-embedded AV player) via a content delivery network (hereinafter "CDN"). The term "streaming parameters" refers to a set of controls implementable by the computer system to modify, change, adapt, and/or schedule storage, access, transcoding, compression, scheduling, and/or distribution of AV content.

Generally, a "rendition" of AV content, as referred to herein, defines a quality level, a combination of a bitrate and a resolution (i.e., a bitrate-resolution pair), for the AV content. Additionally or alternatively, a rendition can define a format, codec, or version (e.g., an audio only version) of the AV content. Therefore, the computer system can transcode an AV content from an original rendition (or mezzanine version) of the AV content to another rendition prior to delivery to a requesting AV player to enable timely transmission of the AV content to an AV player for playback by the AV player.

The computer system can just-in-time transcode and/or store multiple renditions of a single AV segment other than the original rendition to enable AV players to request a rendition that matches the viewing conditions (e.g., mobile viewing over a cellular network, static viewing on a large display) of the AV player via adaptive bitrate streaming technology. The computer system can receive requests for AV segments or byterange-addressable parts of AV segments in any rendition advertised to the AV player. Generally, the computer system can just-in-time transcode an AV segment or byterange-addressable part into a rendition currently requested by an AV player. Additionally, the computer system 100 can predict byterange-addressable part sizes for AV segments based on a "target rendition" for the AV segment in order to account for differences in part sizes between higher-quality and lower-quality renditions of an AV segment.

5. Computer System

As shown in FIG. 7, the computer system 100 can execute Blocks of the second method S200 to broadcast digital AV content (e.g., a series of AV segments) via a host server associated with a URL address via a local browser application and configurable via a virtual browser application. In one example implementation, the computer system 100 can execute Block S210 of the method S200 by receiving a URL directed to a server and accessible by a virtual browser application. Generally, the server can be arranged externally to the computer system 100 and accessible via a virtual browser application running on a user computing device. A user can include a content creator, editor, broadcaster, viewer, or content consumer. In one variation of the example implementation, the computer system 100 can include the server associated with the URL, (e.g., the server can be internal to or integral with the computer system 100 and interface directly or through API with the computer system 100).

As shown in FIG. 7, the example implementation of the second method S200 can further include: by the computer system 100, ingesting an audio visual (AV) segment in an original rendition and characterized by a set of AV features of the AV segment in Block S220. Generally, while ingesting an AV segment in an original rendition, the computer system 100 can extract and calculate a set of AV features describing the AV segment. Thus, the computer system can receive and characterize new AV content for low-latency just-in-time delivery to the server for rendering of the AV content by the virtual browser application.

In one variation of the example implementation, the computer system 100 can ingest pre-recorded AV content by simply uploading a preexisting AV file representing the original AV content. In this implementation, the computer system 100 can segment the ingested AV file into a set of AV segments (e.g., via keyframe segmentation) in an original rendition. Alternatively, the computer system 100 can ingest AV files that have already been segmented into a set of AV segments.

In another variation of the example implementation, the computer system 100 can receive AV content from a livestream in real-time. For example, the computer system 100 can receive and/or access AV content from a livestream associated with a webpage displaying the AV content (e.g., via a video conference or video chat web application embedded within a webpage). Alternatively, the computer system 100 can receive and/or access AV content from a livestream associated with a standalone AV-player application rather than a browser-based livestream. In these alternatives of the example implementation, the computer system 100 can receive individual AV segments or individual parts of segments in an original rendition as these AV segments are recorded and subsequently uploaded to the computer system 100 for transcoding into multiple renditions.

As shown in FIG. 7, the computer system 100 can execute Block S230 of the method S200 by characterizing a set of streaming parameters associated with the server. For example, the server can include a set of software instructions that, when executed by a browser application on the client side (e.g., user device), instruct the browser application on the manner with which content is displayed to the user via the user device. Therefore, the set of streaming parameters can include a set of instructions or conditions that define or instruct the manner in which AV content is rendered and displayed through the server and into a browser application on a remote client device.

Generally, the set of streaming parameters can include a set of input streaming parameters including: real-time messaging protocol (RTMP, RTMPS, RTMPE, RTMPT, RTMFP) instructions and calls; encryption layers; authentication and security layers; bitrate and byterate estimates and revisions; data channels; and timing and synchronization beacons for broadcast streaming of the AV content through the server. Additionally, the set of streaming parameters can also include a set of output streaming parameters associated with the virtual browser application including: total pixel size; rendering and display formatting; display location inside the virtual browser viewable page; content coloration; and/or content audio controls.

Generally, the set of input streaming parameters can be uniformly captured and/or implemented by the virtual browser application without additional user input. The set of output streaming parameters can be managed, edited, adjusted, and/or controlled via user input into an API associated with the virtual browser application. For example, a user (e.g., viewer and/or content creator) can adjust the set of output streaming parameters by adjusting the characteristics and/or behaviors of the virtual browser application. As described in detail below, in response to a change in the set of streaming parameters the computer system 100 can dynamically adjust the streamable AV content.

The method S200 can further include: by the computer system 100, transcoding the AV content into a streamable AV content in response to the set of streaming parameters in Block S240. Generally, the AV content can include a composition of AV content that is rendered and displayed within a webpage by a virtual browser application and other visuals included in the webpage. The computer system 100 can transcode the AV content into a streamable AV content in response to the set of streaming parameters by rendering the AV content (e.g., including the virtual browser application functionality) as an AV stream and thereby transcoding the dynamic attributes of the virtual browser application into a streamable AV content. For example, the AV content can include a set of streaming video files within a conference call application and viewable on a browser. In Block S240, the computer system 100 can: transcode the viewable browser data (e.g., the embedded video files, data, etc.) into the streamable AV content using just-in-time transcoding techniques described above.

The method S200 can further include, by the computer system 100, transmitting the streamable AV content to the server in response to the set of streaming parameters in Block S250. As noted above, the computer system 100 can interface with and interact with the server via an API. Therefore, in Block S250, the computer system 100 can transmit the streamable AV content (e.g., the multiparty conference call) to the server. The server can be associated with a first URL, through which additional viewers can access the streamable AV content. In one variation of the example implementation, the first URL can include an authentication field or token that permits select third-party viewers to access the streamable AV content. For example, the first URL can be directed to an internal company website hosted on internal servers that interface with the computer system 100 through the API as noted above. In operation the computer system 100 can access the livestream from the first URL, generate a webpage including the AV content via the virtual browser application, transcode the AV content for rendering within the webpage as described herein, capture the composition of the rendered webpage and AV content, and rebroadcast the composition as streamable AV content via a second URL, (e.g., a second URL accessible to a viewer or set of viewers). Therefore, a large organization can utilize internal servers, first and second URLs, and the computer system 100 to host and stream a live (or low latency) organization meeting, presentation, or working session. In another variation of the example implementation, the first URL can designate a third-party website located on remote servers and accessible to a large audience, for example for a live sporting event.

In another variation of the example implementation, the method S200 can also include, at a second time: at the computer system 100, receiving from the server an updated set of streaming parameters including a browser configuration for the virtual browser application in Block S260. For example, the initial set of streaming parameters can include a browser configuration for a conference call in which there are four participants, and the screen includes four independent video streams within the browser. If a fifth participant enters the conference call, then the layout of the viewable browser will be adjusted to accommodate a new independent video stream and therefore a new set of streaming parameters.

As shown in FIG. 7, the computer system 100 can execute the method S200 by ingesting the new set of streaming parameters and transcoding the updated streamable AV content in Block S270. Generally, receipt of the new set of streaming parameters at the computer system 100 and the transcoding performed by the computer system 100 occurs in real-time or substantially in real-time.

Furthermore, as shown in FIG. 7, the computer system 100 can execute Block S280 of the method S200 by transmitting the updated streamable AV content to the server in response to the updated streaming parameters. As noted above, the server can be associated with a second URL such that a third-party viewer can access the updated streamable AV content via the server and receive the broadcast of the updated streamable AV content. Therefore, in this variation of the example implementation, the computer system 100 can dynamically update the stream of the AV content via the dynamic nature of the webpage and virtual browser application, thereby providing all the advantages of the web applications to a broadcast (e.g., a live) AV audience of viewers accessing the AV content via the second URL. As noted above, the AV content can include live, delayed, or stored AV content captured and ingested by the computer system 100 in any initial format or rendition and transcoded into streamable AV content that is viewable through a virtual browser application.

6. Server/Browser

As shown in FIG. 8, a third method S300 for AV content broadcasting can include: at a server, associating a URL with the server such that the server is remotely accessible through a local browser application in Block S310.

As shown in FIG. 8, the server can execute Block S320 of the method S300 by transmitting a set of streaming parameters to a computer system 100 (e.g., a remote computer system). As described above, the transmission of the set of streaming parameters can include transmitting, interfacing, and/or communicating with the computer system 100 through an API to deliver a set of instructions or conditions that define or instruct the way AV content is rendered and displayed through the server and into a local browser application on a remote client device. As noted above, the set of streaming parameters can include a set of input streaming parameters including: real-time messaging protocol (RTMP, RTMPS, RTMPE, RTMPT, RTMFP) instructions and calls; encryption layers; authentication and security layers; bitrate and byterate estimates and revisions; and timing and synchronization beacons for broadcast streaming of the AV content through the server. The set of streaming parameters can also include a set of output streaming parameters associated with the virtual browser application (e.g., virtual browser) including: total pixel size; rendering and display formatting; display location inside the virtual browser viewable page; content coloration; and/or content audio controls.

As shown in FIG. 8, the server can execute Block S330 of the method S300 by receiving streamable AV content from the computer system 100 based on the set of streaming parameters. In one variation example implementation of the method S300, the AV content can be transcoded by the computer system 100 executing methods and techniques described above. For example, the computer system 100 can transcode the AV content into streamable AV content based on the set of streaming parameters by rendering the AV content within a virtual browser application and rebroadcasting the as the streamable AV content, thereby composing the dynamic attributes of the virtual browser application with the AV content.

As shown in FIG. 8, the server can execute Block S340 of the method S300 by hosting the streamable AV content such that the streamable AV content is streamable via the virtual browser application to a set of remote computing devices. In one variation of the example implementation of the method S300, the server functions to broadcast the streamable AV content via a webpage associated with a first URL (i.e., the URL of the webpage rendered by the virtual browser application). For example, the server can function as a virtual participant in a browser-based videoconference call (e.g., in a passive manner), and broadcast the videoconference call through the URL such that the composite view of the videoconference call is viewable by a set of third-party viewers with access to the URL.

As shown in FIG. 8, the second method S300 can further include, at a second time: at the server, receiving an updated set of streaming parameters including a browser configuration in Block S350. As noted above, the initial set of streaming parameters can include a browser configuration for a conference call in which there are four participants, and the screen includes four independent video streams within the browser. If a fifth participant enters the conference call, then the layout of the viewable browser will be adjusted to accommodate a new independent video stream and therefore a new set of streaming parameters. In another example, a set of cameras can record and capture AV content of a sporting event from different angles or elevations. In one set of streaming parameters, a webpage rendered by the virtual browser application can display the feeds from a subset of the set of cameras. In an updated set of streaming parameters, the virtual browser application can be configured to display a single camera feed highlighting a particular view or vantage point of the sporting event.

Accordingly, the server can adaptively and dynamically: receive updated viewing parameters at the virtual browser application API; transmit the updated set of streaming parameters (e.g., changes in resolution, formatting, audio quality, etc.) to the computer system 100 in Block S360 of the method S300; and receive updated streamable AV content from the computer system 100 in response to the updated set of streaming parameters in Block S370. As noted above, the interaction between the server and the computer system 100 can transpire in real-time or near real-time with low latency such that the updated streamable AV content is returned to the server with minimal latency.

As shown in FIG. 8, the server can execute Block S380 of the method S300 by hosting the updated streamable AV content such that the updated streamable AV content is streamable to a set of remote computing devices. As noted above, the server can be associated with a second or output URL through which remote computing devices operating local browser applications can access the content hosted by the server. Accordingly, as the updated streamable AV content is transcoded and delivered to the server, the local browser application(s) directed at the server will render and display updated streamable AV content in real-time or near real-time such that the viewing experience is seamless to the viewer.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method for video content publishing comprising:
for a first streaming event associated with a first user, accessing a first streaming configuration defining:
a default viewing arrangement defining a default set of viewing characteristics;
a first trigger event linked to a first target viewing arrangement defining a first set of viewing characteristics different from the default set of viewing characteristics; and
a second trigger event linked to a second target viewing arrangement defining a second set of viewing characteristics different from the first set of viewing characteristics;
accessing a primary video stream, comprising a first set of video content, from a first online video platform;
accessing a secondary video stream comprising a second set of video content;
at an initial time:
combining the primary video stream and the secondary video stream according to the default viewing arrangement;
at a first time:
detecting the first trigger event in the primary video stream;
in response to detecting the first trigger event, combining the primary video stream and the secondary video stream into a first composite video according to the first target viewing arrangement; and
publishing the first composite video to a second video platform, different from the first video platform, approximately concurrently with the primary video stream; and
at a second time:
detecting the second trigger event in the secondary video stream;
in response to detecting the second trigger event, combining the primary video stream and the secondary video stream into a second composite video according to the second target viewing arrangement; and
updating the first composite video with the second composite video published to the second video platform.
2. The method of claim 1:
wherein accessing the primary video stream comprises accessing a livestream comprising the first set of video content from the first online video platform; and wherein publishing the first composite video to the second platform comprises publishing the first composite video to the second platform within two seconds of the primary video stream.

3. The method of claim 1:
wherein accessing the first configuration comprises accessing the first configuration according to a latency proportional to a set of characteristics defining the first configuration; and
wherein publishing the first composite video to the second video platform comprises, at the first time, publishing the first composite video within a first latency proportional to a first set of characteristics defining the first configuration.

4. The method of claim 3, further comprising:
accessing a second configuration defining:
   a third trigger event linked to a third target viewing arrangement defining a third set of viewing characteristics; and
at a third time:
   detecting the third trigger event in the secondary video stream;
   in response to detecting the third trigger event, combining the primary video stream and the secondary video stream into a third composite video according to the third target viewing arrangement; and
   publishing the third composite video to the second video platform within a second latency, different from the first latency, and proportional to the second set of characteristics defining the second configuration.

5. The method of claim 1, further comprising, for a second streaming event associated with the first user:
accessing a second configuration defining:
   a second default viewing arrangement defining a second default set of viewing characteristics; and
   a third trigger event linked to a third target viewing arrangement defining a third set of viewing characteristics;
generating a tertiary video stream comprising a third set of video content;
generating a quaternary video stream comprising a fourth set of video content;
at an initial time:
   combining the tertiary video stream and the quaternary video stream according to the second default viewing arrangement; and
at a first time:
   detecting the third trigger event in the quaternary video stream;
   in response to detecting the third trigger event, combining the tertiary video stream and the quaternary video stream into a third composite video according to the third target viewing arrangement; and
   publishing the third composite video to third video platform.

6. The method of claim 1:
wherein accessing the first configuration comprises accessing the first configuration defining a first visual content trigger linked to a first resource; and
further comprising, at the first time:
   detecting a first set of visual features in the primary video stream;
   correlating a first visual feature, in the first set of visual features and associated with an initial timestamp in the primary video stream, with the first visual content trigger;
   retrieving the first resource according to the first configuration;
   fusing the primary composite video and the first resource to generate a secondary composite video according to the first configuration, the secondary composite video containing the first resource proximal the initial timestamp; and
   publishing the secondary composite video to the second video platform.

7. The method of claim 1:
wherein accessing the first configuration comprises accessing the first configuration defining a first target concept; and
further comprising, at the second time:
   accessing an audio stream associated with the primary video stream;
   detecting a first language concept in the audio stream;
   in response to correlating the first language concept with the first target concept, retrieving a second resource associated with the first language concept and first target concept;
   fusing the secondary composite video and the second resource into a tertiary composite video according to the first configuration; and
   publishing the tertiary composite video to the second video platform.

8. A method comprising:
for a first streaming event associated with a first user:
   accessing a default configuration defining a default set of viewing characteristics;
   accessing a first configuration defining:
      a first visual content trigger linked to a first resource; and
      a first viewing arrangement of visual content of a primary video stream and the first resource; and
   accessing a second configuration defining:
      a second visual content trigger linked to a second resource; and
      a second viewing arrangement of visual content of the primary video stream and the second resource;
   accessing a primary video stream recorded by a remote compute device associated with the first user, from a first video platform;
   at an initial time:
      streaming the primary video stream to a second video platform according to the default configuration;
   at a first time:
      detecting a first set of visual features in the primary video stream;
      correlating a first visual feature, in the first set of visual features and associated with a first timestamp in the primary video stream, with the first visual content trigger;
      retrieving the first resource according to the first configuration;
      fusing the primary video stream and the first resource into a first composite video according to the first configuration, the first composite video containing the first resource proximal the first timestamp; and
      publishing the first composite video to the second video platform; and
   at a second time:
      detecting a second set of visual features in the primary video stream;

correlating a second visual feature, in the second set of visual features and associated with a second timestamp in the primary video stream, with the second visual content trigger;
retrieving the second resource according to the second configuration;
fusing the first composite video and the second resource into a second composite video according to the second configuration, the second composite video containing the second resource proximal the second timestamp; and
publishing the second composite video to the second video platform.

9. The method of claim 8:
wherein publishing the first composite video to the second video platform comprises:
transcoding the first composite video into a first target rendition; and
publishing the first composite video in the first target rendition to the second video platform; and
further comprising:
transcoding the second composite video into a second target rendition; and
publishing the second composite video in the second target rendition to a third video platform.

10. The method of claim 8:
wherein retrieving the first resource comprises retrieving the first resource defining a first URL linked to a first webpage within a browser; and
wherein retrieving the second resource comprises retrieving the second resource defining a second URL linked to a second web page within the browser.

11. The method of claim 8, further comprising:
during a first time period of the primary video stream, in response to receiving an indication specifying removal of the first resource from the first composite video, flagging the first resource; and
during a second time period of the primary video stream, in response to flagging the first resource at a resource removal frequency exceeding a removal frequency threshold:
removing the first resource from the first composite video; and
withholding aggregation of the primary video stream and the first resource into the first composite video during a third time period of the primary video stream.

12. The method of claim 8:
further comprising:
identifying a first set of resources associated with a first target content; and
deriving the first configuration defining the first visual content trigger linked to the first set of resources associated with the first target content; and
further comprising:
identifying a second set of resources associated with a second target content; and
deriving the second configuration defining the second visual content trigger linked to the second set of resources associated with the second target content.

13. The method of claim 12, further comprising, at the first time:
in response to detecting access to a second resource in the first set of resources at a first resource access frequency exceeding a resource access threshold, prioritizing the second resource within the first set of resources; and in response to detecting access to a third resource in the second set of resources at a second resource access frequency falling below the resource access threshold, removing the third resource from the second set of resources.

14. The method of claim 8, further comprising, at a third time:
accessing a first audio configuration defining a first set of target concepts;
accessing an audio stream in the primary video stream;
detecting a first language concept in the audio stream associated with the primary video stream;
in response to correlating the first language concept with a first target concept in the first set of target concepts, retrieving a third resource associated with the first language concept and first target concept; and
aggregating the third resource into the first composite video according to the first configuration to update the first composite video.

15. The method of claim 8, further comprising,
at a third time:
accessing a first content configuration defining:
a default viewing arrangement defining a default set of viewing characteristics; and
a first trigger event linked to a first target viewing arrangement defining a first set of viewing characteristics different from the default set of viewing characteristics;
accessing a secondary video stream comprising a second set of video content, from a third video platform; and
combining the second composite video and the secondary video stream according to the default viewing arrangement of the first content configuration; and
at a fourth time:
in response to detecting the first trigger event in the secondary video stream, combining the second composite video and the secondary video stream according to the first target viewing arrangement of the first content configuration; and
publishing the second composite video and the secondary video stream according to the first target viewing arrangement to the second video platform.

16. A method comprising:
for a first streaming event associated with a first user:
accessing a default configuration defining a default set of viewing characteristics;
accessing a first audio configuration defining:
a first target concept linked to a first resource at a first webpage; and
a first viewing arrangement of visual content of a primary video stream and the first resource; and
accessing a second audio configuration defining:
a second target concept linked to a second resource at a second webpage; and
a second viewing arrangement of visual content of the primary video stream and the second resource;
accessing a primary video stream comprising an audio stream, recorded by a remote compute device associated with the first user, from a first video platform;
at an initial time:
streaming the primary video stream to a second video platform according to the default configuration;
at a first time:
detecting a first language concept in the audio stream of the primary video stream;

correlating the first language concept, associated with a first timestamp in the primary video stream, with the first target concept;
retrieving the first resource according to the first configuration;
aggregating the primary video stream and the first resource into a first composite video according to the first audio configuration, the first composite video containing the first resource proximal the first timestamp; and
publishing the first composite video to the second video platform; and at a second time:
detecting a second language concept in the audio stream of the primary video stream;
correlating the second language concept, associated with a second timestamp in the primary video stream, with the second target concept;
retrieving the second resource according to the second configuration;
fusing the first composite video and the second resource into a second composite video according to the second configuration, the second composite video containing the second resource proximal the second timestamp; and
publishing the second composite video to the second video platform.

17. The method of claim 16:
wherein retrieving the first resource comprises retrieving a first image associated with the first target concept from a first webpage; and
wherein retrieving the second resource comprises retrieving a first video associated with the second target concept from a second webpage.

18. The method of claim 16:
at the first time:
accessing a first content configuration defining:
a first trigger event linked to a first target viewing arrangement defining a first set of viewing characteristics; and
accessing a secondary video stream comprising a second set of video content, from the first online video platform associated with a webpage;

at the second time:
detecting the first trigger event in the secondary video stream;
combining the second composite video and the secondary video stream according to the first target viewing arrangement; and
updating the second composite video at the second video platform.

19. The method of claim 16:
wherein accessing the first audio configuration comprises accessing the first audio configuration defining the first target concept linked to a first set of resources ranked according to a first criteria, each resource in the first set of resources linked to a unique webpage including content associated with the first target concept; and
wherein accessing the second audio configuration comprises accessing the second audio configuration defining the second target concept linked to a second set of resources ranked according to the criteria, each resource in the second set of resources linked to a unique webpage including content associated with the second target concept.

20. The method of claim 16:
further comprising accessing a first visual configuration defining a first visual content trigger linked to a third resource; and
further comprising, at a third time:
detecting a first set of visual features in the primary video stream;
correlating a first visual feature, in the first set of visual features and associated with third timestamp in the primary video stream, with the first visual content trigger;
retrieving the third resource according to the first configuration;
fusing the second composite video and the third resource to generate a tertiary composite video according to the first visual configuration, the tertiary composite video containing the third resource proximal the third timestamp; and
publishing the tertiary composite video to the second video platform.

* * * * *